(12) United States Patent
Kossat et al.

(10) Patent No.: US 6,370,919 B1
(45) Date of Patent: Apr. 16, 2002

(54) METHOD OF SETTING PARAMETERS FOR WELDING OPTICAL WAVEGUIDES BY DETERMINING THE REDUCTION OF A CONSTRUCTION DIAMETER

(75) Inventors: Rainer Kossat, Aschau; Gervin Ruegenberg, München; Frank Zimmer, Scheuring; Roman Donabauer, Wörth, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/284,760

(22) PCT Filed: Oct. 22, 1997

(86) PCT No.: PCT/DE97/02461

§ 371 Date: Jan. 9, 1999

§ 102(e) Date: Jan. 9, 1999

(87) PCT Pub. No.: WO98/18032

PCT Pub. Date: Apr. 30, 1998

(30) Foreign Application Priority Data

Oct. 22, 1996 (DE) .......................................... 196 43 661

(51) Int. Cl.[7] .............................................. C03B 37/028
(52) U.S. Cl. ............................. 65/381; 65/411; 65/486; 65/382
(58) Field of Search ........................... 65/411, 381, 435, 65/486, 382, 378

(56) References Cited

U.S. PATENT DOCUMENTS

| | | | |
|---|---|---|---|
| 3,579,316 A | * 5/1971 | Dyott | 65/411 |
| 4,565,558 A | 1/1986 | Keil et al. | |
| 4,765,816 A | 8/1988 | Bjornlie et al. | |
| 4,895,423 A | * 1/1990 | Bilodeau | 65/411 |
| 5,009,478 A | * 4/1991 | Sasaki | 65/411 |
| 5,078,489 A | 1/1992 | Lieber | |
| 5,176,730 A | * 1/1993 | Suganuma | 65/411 |
| 5,309,536 A | * 5/1994 | Suganuma | 65/411 |
| 5,318,610 A | * 6/1994 | Takimoto | 65/411 |
| 5,420,949 A | * 5/1995 | Arima | 65/411 |
| 5,496,390 A | * 3/1996 | Arima | 65/381 |
| 5,620,494 A | * 4/1997 | Sasaoka | 65/378 |
| 5,707,564 A | * 1/1998 | Rivoallan | 65/435 |
| 6,018,965 A | * 2/2000 | Bloom | 65/381 |

FOREIGN PATENT DOCUMENTS

| | | |
|---|---|---|
| DE | 28 39 428 | 3/1980 |
| DE | 38 06 866 | 9/1989 |
| EP | 0 232 520 | 8/1987 |
| EP | 0 320 978 | 6/1989 |

OTHER PUBLICATIONS

Abstract of Japanese Published Application 60–237408, *Patent Abstracts of Japan*, vol. 010, No. 106 (P–4499), Apr. 22, 1986.

Abstract of Japanese Published Application 02–129607, *Patent Abstracts of Japan*, vol. 014, No. 353 (P 1086), Jul. 31, 1990.

Abstract of Japanese Published Application 05–341150, *Patent Abstracts of Japan*, vol. 018, No. 178 (P 1716), Mar. 24, 1994.

\* cited by examiner

*Primary Examiner*—John Hoffmann

(57) ABSTRACT

A test optical fiber section (F) that resides under tensile stress (F) is heated in at least one longitudinal location so that a constriction ($\Delta d$) of its outside circumference forms thereat. This constriction ($\Delta d$) is acquired and utilized for setting welding parameters.

24 Claims, 9 Drawing Sheets

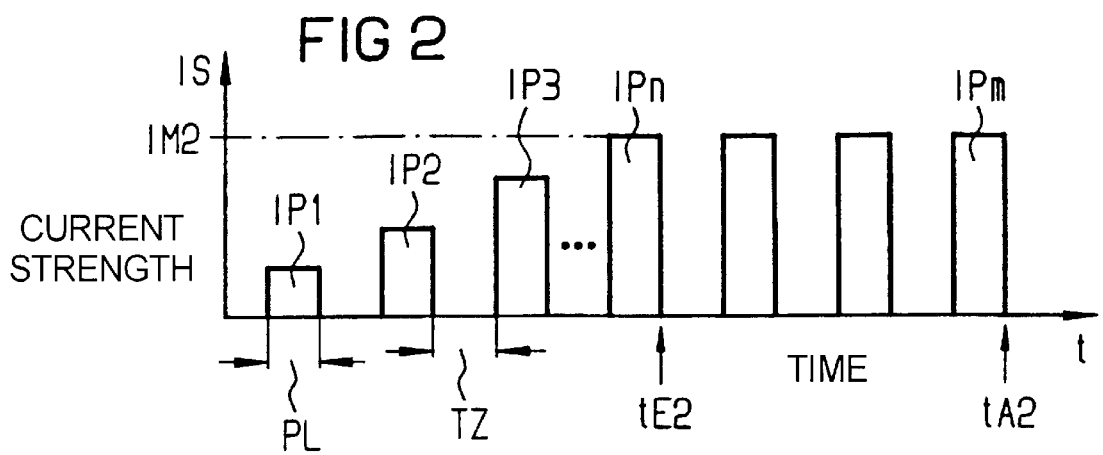
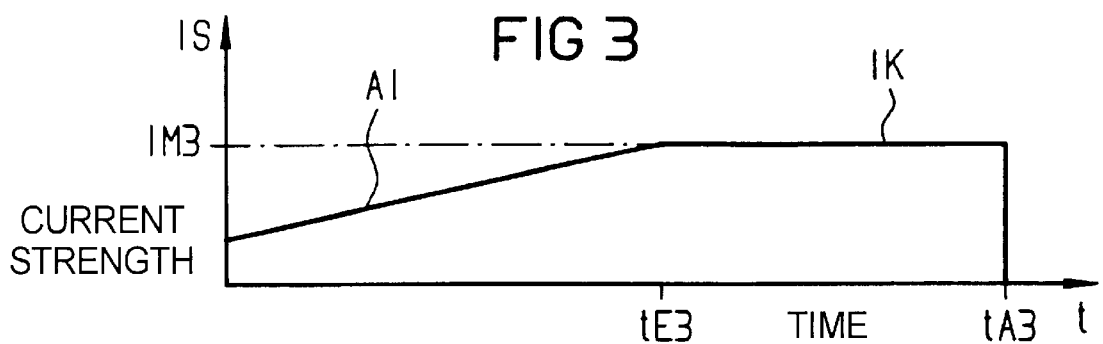
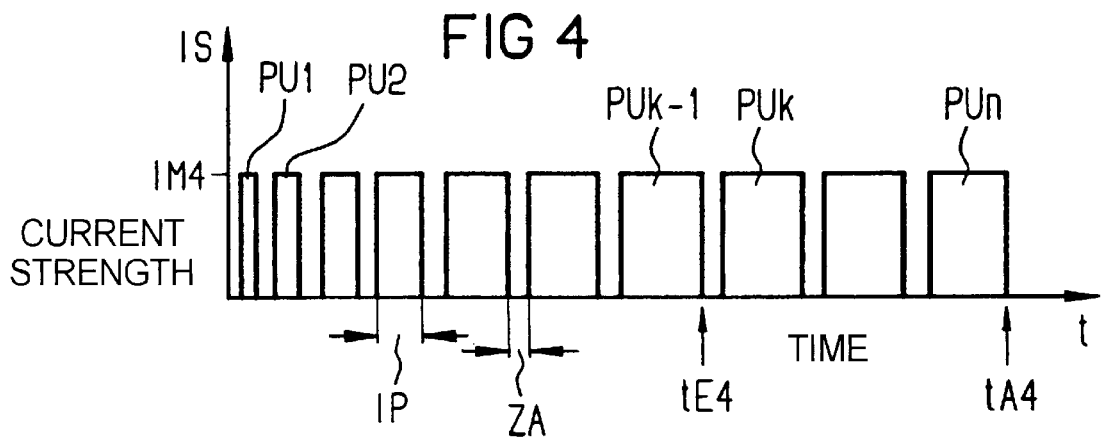

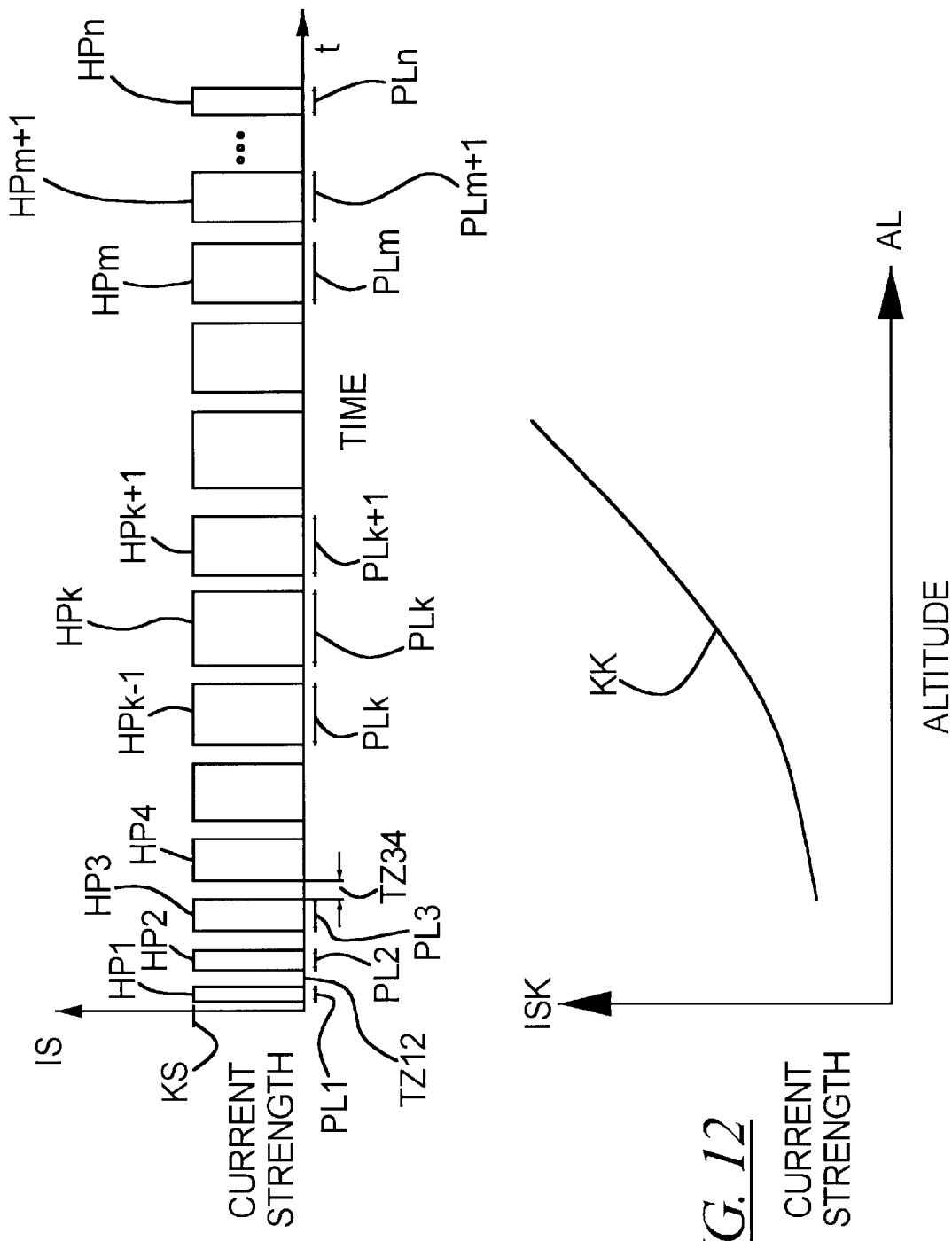

METHOD OF SETTING PARAMETERS FOR WELDING OPTICAL WAVEGUIDES BY DETERMINING THE REDUCTION OF A CONSTRUCTION DIAMETER

BACKGROUND OF THE INVENTION

The invention is directed to a method for setting welding parameters for the production of thermal welds between at least two light waveguides.

In practice, the correct setting of what are referred to as welding or, respectively, splicing parameters (such as, for example, strength of welding current, welding duration, welding energy, electrode spacing, electrode position, etc.) can be made more difficult for thermal welding, particularly fusion welding, of light waveguides.

For setting the heat quantity for welding two respective optical fibers in the known method of EP 0 320 978, for example, a bare optical fiber end is exposed to heat, is thereby melted and rounded off due to the surface tension of the glass material which has been rendered viscous. As a result thereof, the fiber end retracts from its original final position before the welding process. That distance by which the fiber end melts back in the longitudinal fiber direction under the influence of heat and thereby shortens in length corresponds to the activated heat quantity. It is measured in order to quantitatively acquire and then set this heat quantity. This known procedure, however, is highly affected by errors. One reason for this is, in particular, that the welding conditions during the rounding procedure deviate too greatly from those during normal welding of two optical fibers.

SUMMARY OF THE INVENTION

The invention is based on the object of disclosing an improved way how one or more welding parameters for thermal welding of light waveguides can be set under a multitude of practical conditions. This object is inventively achieved in a method of the species initially cited in that at least one test optical fiber section is subjected to a defined tensile stress during a prescribable testing time; in that the test optical fiber section is heated in at least one longitudinal location during this stress load; and in that a constriction that forms at the heating location at the outside circumference of the test optical fiber section under the continuing tensile stress is acquired and utilized for setting one or more of the welding parameters.

This makes it possible to adapt the welding or, respectively, splicing parameters to different welding or, respectively, splicing conditions (such as, for example, atmospheric moisture, air pressure, air temperature, optical fiber type, electrode condition, etc.) in a simple as well as reliable way. An improved splice quality can be achieved in this way.

The invention is also directed to a method for welding respectively two optical fibers allocated to one another, whereby at least one preliminary trial in at least one test optical fiber section is first implemented for the respectively currently existing welding conditions in order to determine an optimum set of welding parameters, whereby the test optical fiber section is subjected to a defined tensile stress in this preliminary trial for a prescribable testing time, whereby the test optical fiber section is heated in at least one longitudinal location during this tensile stress so that a constricting effect is produced thereat at the heating location at the outside circumference of the test optical fiber section under the continuing tensile stress, whereby this constricting effect is acquired and utilized for optimizing the set of welding parameters for the existing welding conditions, and whereby the weld of two respective optical fibers to be actually welded to one another is produced only after this at least one preliminary trial, being produced with the identified, optimized set of welding parameters.

The invention is also directed to an apparatus for setting welding parameters for producing thermal welds between at least two optical waveguides which is characterized in that at least one traction means is provided with which at least one test optical fiber section can be subjected to a defined tensile stress during a prescribable testing time; in that at least one heating device is provided with which the test optical fiber section residing under tensile stress can be heated in at least one longitudinal location; and in that means are provided with which a constriction being formed at the outside circumference of the test optical fiber section can be acquired and utilized for setting one or more of the welding parameters.

BRIEF DESCRIPTION OF THE DRAWINGS

FIGS. 2 through 4 respective schematic illustrations of various welding current/time diagrams for the implementation of various embodiments of the inventive method;

FIG. 11 a schematic illustration showing a sequence of heat pulses for the implementation of the version of the method according to FIGS. 7 through 10;

FIG. 12 a schematic illustration of a diagram for correcting the strength of the welding current.

DESCRIPTION OF THE PREFERRED EMBODIMENTS

Figure 1:
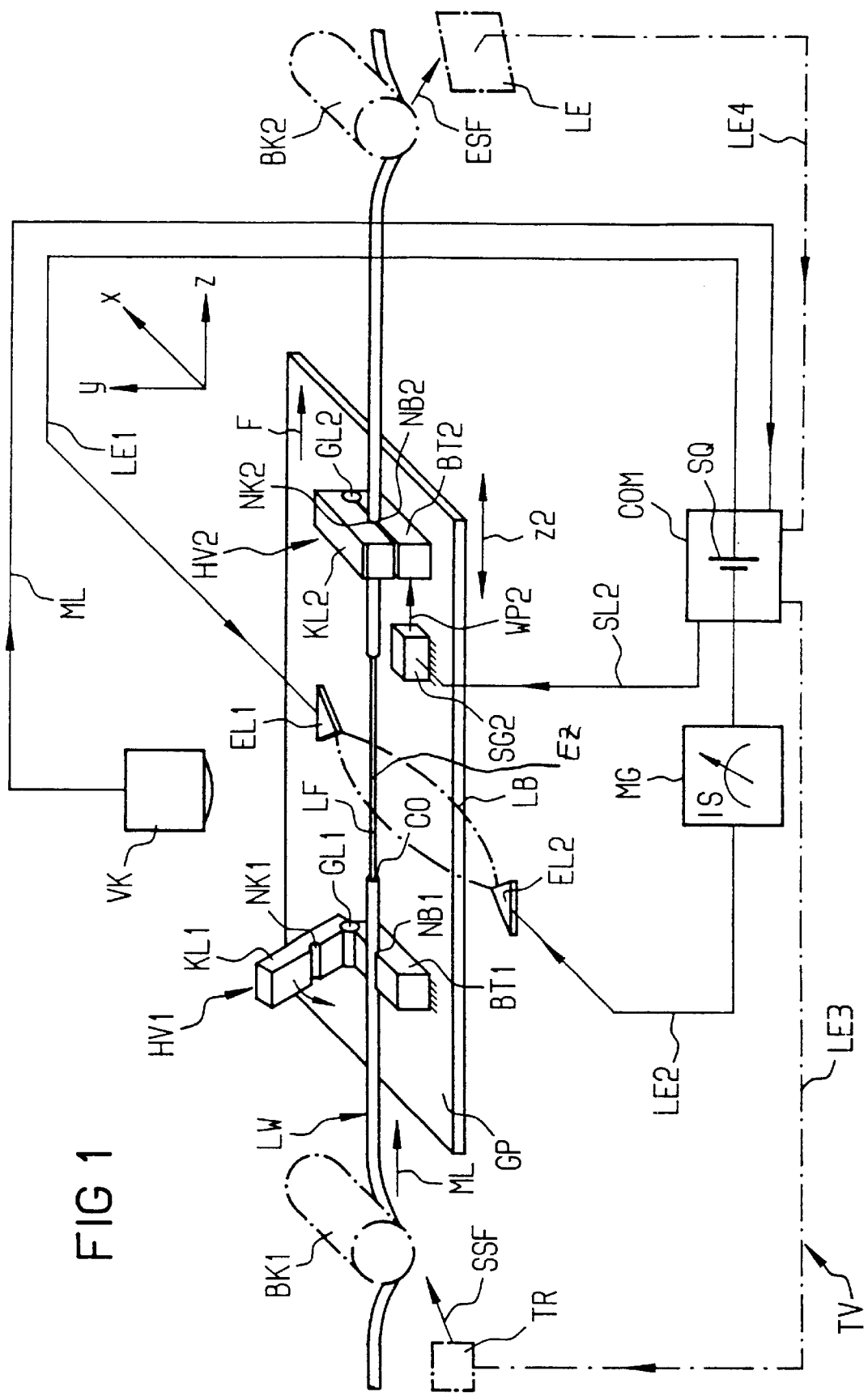
FIG. 1 a schematic, partially perspective illustration of the basic structure of an apparatus for the implementation of the inventive method.

Elements having the same function and action are respectively provided with the same reference characters in FIGS. 1 through 12. In a partially perspective view, FIG. 1 schematically shows the basic structure of a welding device TV with whose assistance an optimum set of welding or, respectively, splicing parameters can be identified and set for the thermal welding of at least two light waveguides given the presence of specific welding or, respectively, splicing conditions (such as, for example, atmospheric moisture, air pressure, air temperature, fiber type, electrode spacing, etc.). The welding device TV is preferably a component part of a light waveguide splicing apparatus, particularly light waveguide fusion welding apparatus. A continuous light waveguide LW is placed into this welding device TV of FIG. 1. A plastic coating CO (=primary and/or secondary coating) is removed along a prescribable sub-length, so that a continuous test optical fiber section LF is exposed bare there. The coated light waveguide LW, i.e. the light waveguide LW coated with plastic in one or more coats, is held and fixed in position at both sides of this test optical fiber section LF in at least one holding mechanism such as, for example, HV1 or, respectively, HV2 of a known type (such as, for example, manipulators).

For a better illustration of the fixing effect of the respective holding device, the holding device HV1 is shown in its open condition in the left half of the illustration of FIG. 1. It comprises a base part BT1 on whose upper side a longitudinal channel NB1 is let in, the coated light waveguide LW being placed therein. A cover or, respectively, a flap KL1 that can be swivelled in the direction onto the base part BT1 is attached to the base part BT1 via an articulation GL1, hinge or the like. A longitudinal channel NK1 corresponding to the longitudinal channel NB1 in the base part BT1 is provided at the inside of the cover KL1. After closing the holding device HV1, thus, the light waveguide LW is clamped between the base part BT1 and the cover KL1 and is held fast thereat. Analogously thereto, the holding mechanism HV2 fixes the coated light waveguide LW at a longitudinal location that lies opposite the location position of the first holding device HV1 with respect to the exposed test optical fiber section LF. FIG. 1 shows the holding device HV2 in the closed condition, whereby the coated light waveguide LW is clamped between the base part BT2 and the cover KL2 of the holding device HV2 and is thereby held fast. The cover KL2 is thereby pivotably attached to the base part BT2 with the assistance of an articulation GL2. For attitudinal positioning of the light waveguide LW, a longitudinal channel NB2 is let in at the inside, the upper side of the base part BT2 here, and a longitudinal channel NK2 corresponding thereto is let in at the inside of the cover KL2, the underside here.

The two holding devices HV1, HV2 are arranged on a common base plate GP. At least one of the holding devices HV1 or, respectively, HV2 is fashioned displaceable in at least one spatial direction. Given the test mechanism TV of FIG. 1, for example, the second holding device HV2 is displaceable along the axial longitudinal extent of the test optical fiber section LF, whereas the first holding device HV1 is stationarily attached on the base plate GP. The displacement direction of the second holding device HV2 in the example corresponds to the spatial direction z of a Cartesian coordinate system x,y, z. The displaceability of the holding device HV2 in the z-direction is indicated with a double arrow Z2 in FIG. 1. The spatial direction x proceeds transversely to the longitudinal extent of the light waveguide LW, particularly perpendicularly, i.e. orthogonally to the spatial direction z. The planar base plate GP lies, in particular, parallel to the plane erected by the x-direction and z-direction. The spatial direction y resides perpendicular to this x,z-plane, i.e. it proceed from top to bottom.

In order to then be able to charge the test optical fiber section LF with a prescribable, i.e. defined tensile stress F during a prescribable testing time, the holding device HV2 is moved away from the stationary holding device HV1 in the z-direction by a prescribable longitudinal distance—toward the right here in FIG. 1. To that end, an actuator SG2 that receives its control signals from an evaluation/control means COM via a control line SL2 is allocated to the holding device HV2. The displacement effect of the actuator SG2 on the holding device HV2 is schematically indicated in FIG. 1 with the assistance of an action arrow WP2. As a result of the fact that the light waveguide LW is held stationary at one side of its exposed optical fiber section LF with a holding device such as, for example, HV1 but is moved away from this stationary holding device with a traction means (formed here, in particular, by the second holding device HV2) at what is the opposite side with respect to the optical fiber section LF, the test optical fiber section LF is stretched, preferably on a straight line, along its longitudinal axis, i.e. axial longitudinal extent, between the two holding devices HV1, HV2. As warranted, other relative motions between the two holding devices HV1, HV2 of FIG. 1 are also possible for producing a tensile force along the optical fiber section LF. In particular, thus, it can be expedient to fashion the first holding device HV1 likewise displaceable in the axial longitudinal direction of the test optical fiber section LF in addition to or independently of the second holding device HV2 of FIG. 1 and to allocate a separate actuator to it. Such an actuator for the holding device HV1 is additionally entered in FIG. 6 for the welding device TV and is referenced SG1. Therein, it is connected by a control line SL1 (entered dot-dashed) to the evaluation/control means COM and can be activated as well as deactivated proceeding from the latter. Its displacement effect on the holding device HV1 is schematically indicated with the assistance of an action arrow WP1. The displacability ability of the holding device HV1 in the z-direction is illustrated with the assistance of a double arrow Z1. In order to be able to place the test optical fiber section between two such holding devices HV1, HV2 under a prescribable tensile stress in longitudinal fiber direction, the two holding devices HV1, HV2—now fashioned displaceable—are preferably moved apart along the axial longitudinal extent of the light waveguide LF.

Viewed in summary, thus, the inventive welding device comprises at least one traction means with which the respective test optical fiber section can be subjected to a defined tensile stress in longitudinal fiber direction during a prescribable testing time. The traction means preferably pulls such that the test optical section such that this is stretched along a straight line. In particular, the force of the tensile stress acting along the axial longitudinal axis of the test optical fiber section is kept essentially constant for a prescribable testing time. The optical fiber section LF is preferably charged with a tensile stress of at most 4N, particularly between 0.5 and 3 N.

During this tensile load on the test optical fiber section LF, this is heated in the region of least one longitudinal location EZ (FIG. 1) with the assistance of at least one heating device, particularly a thermal heat source, being particularly melted, i.e. brought to melting temperature of its glass material. To that end, for example, two welding electrodes EL1, EL2 are arranged in the inner space in FIG. 1 between the two holding devices HV1, HV2 so that what is referred to as an arc can form by glow discharges between them transaxially, particularly perpendicularly, to the longitudinal extent of the test optical fiber section LF. The course of the region in which a respective arc can propagate between the two electrodes EL1, EL2 (=heating or, respectively, welding region) is merely indicated in FIG. 1 in the form of an elongated, dot-dashed ellipse for the sake of graphic simplicity and is referenced LB. Whereas the electrode EL2 is allocated to the one long side of the test optical fiber section LF, the electrode EL2 is located at the long side of the test optical fiber section LFI opposite the welding electrode EL1. In particular, the welding electrode EL1 lies opposite the welding electrode EL2 offset by approximately 180°. The respective welding electrode EL1 or, respectively, EL2 is connected via an appertaining current lead LE1, or respectively, LE2 to a voltage source SQ that is preferably a component part of the evaluation/control means COM. For the sake of graphic simplicity, the voltage SQ is merely symbolically indicated in FIG. 1. For example, an ammeter MG is inserted into the current lead LE2, this measuring and displaying the strength of the discharge current IS of the glow discharges between the two electrodes EL1, EL2. The measuring instrument ME can thereby be likewise integrated as warranted in the evaluation/control means COM, so that the measured strengths of discharge current of the glow discharges as well as their appertaining discharge durations are offered for evaluation therein.

The test optical fiber section LF residing under the defined tensile stress F is preferably heated in the welding device TV of FIG. 1 in at least one longitudinal location, particularly incipiently melted, until a specific, measurable constriction (=tapering) of its outside circumference is achieved, i.e. a cross sectional reduction. From the information as to whether a constriction occurs at all and/or from the degree of a potentially effected constriction, particularly the radial constriction depth thereof, conclusions regarding the glass viscosity of the optical fiber employed given its heating can then be advantageously indirectly acquired. In order to be able to acquire a potentially forming constriction at the outside circumference of the test optical fiber section LF in the region of the respective heating location such as, for example, EZ this heating location has an optical imaging or, respectively, image processing system VK, particularly a video camera, allocated to it as acquisition means. An image processing system as disclosed and described in detail in U.S. Pat. No. 5,011,259 is preferably suited. in FIG. 1, the optical image processing system VK above the base plate GP is merely shown simplified for the sake of graphic clarity. The optical image processing system VK is connected via a test line ML to the evaluation/control means COM in order to be able to evaluate the image information it registers.

Viewed in summary, thus, an optical image of the respective test optical fiber section is thus preferably produced in at least one projection plane, and the image information of this fiber image are offered for evaluation. At least one test criterion for the constricting effect can then be advantageously determined from this image information of the test optical fiber section.

Of course, it can also be expedient to determine or, respectively, to acquire a potential constriction of the outside circumference of the test optical fiber section LF, i.e. its cross sectional reduction as a result of the axial tensile stress load in combination with the heating, with the assistance of other measuring means. The components (such as, for example, BK1, BK2, TR, LE, LE3, LE4) of such an additional or alternative measuring system for the determination of a potential constriction are also entered dot-dashed in FIG. 1. At the one side of the test optical fiber section LF it comprises an optical transmitter TR, particularly a laser diode, and comprises an optical receiver LE, particularly a light-sensitive element, at the other, opposite side of the test optical fiber section LF. Portions of the transmission radiation field SSF of the optical transmitter TR are coupled into the light waveguide LW at the transmission side (at the left half of the image here in FIG. 1) with the assistance of a flex coupler BK1, being coupled in the direction toward the exposed test optical fiber section LF (the flex coupler BK1 is thereby arranged in front of the holding device HV1 when viewed from left to right.) The drive of the optical transmitter TR can ensue with the evaluation/control means COM via a control line LE3. In this way, test light ML in FIG. 1 traverses the exposed test optical fiber section LF from left to right. Portions of this test light ML can be coupled out at the reception side with the assistance of a second flex coupler BK2 after passing through the test optical fiber section LF, said second flex coupler BK2 being coupled to the coated light waveguide LW following the second holding device HV in the right half of the illustration of FIG. 1. The reception radiation field ESF of these test light portions coupled out at the reception side is acquired in FIG. 1 with the assistance of at least one light sensitive element LE, particularly a photodiode, and is forwarded via a test line LE4 to the evaluation/control means COM for evaluation. This makes it possible to identify modifications of the test light ML sent via the test optical fiber section LF and to utilize these modifications as a criterion for a potential constriction at the outside circumference of the optical fiber.

In particular, it can thereby be expedient to determine the attenuation of the test light ML conducted in the test optical fiber section LF with the assistance of the measuring method disclosed by U.S. Pat. No. 5,078,489 ("fight injection and detection"). When a constriction forms at the outside circumference of the optical fiber residing under tensile stress as a result of the heating with the arc LB, namely, an increase in the attenuation of the light transmission is thereby caused. The alternation becomes all the greater the greater the constriction, so that an unambiguous allocation between the temporal registration of the attenuation curve and the degree of constriction is possible. The cross sectional reduction of the test optical fiber section LF, particularly the constriction depth of its melted glass material in radial direction, is thus all the greater the higher the increase in attenuation.

Figure 5:
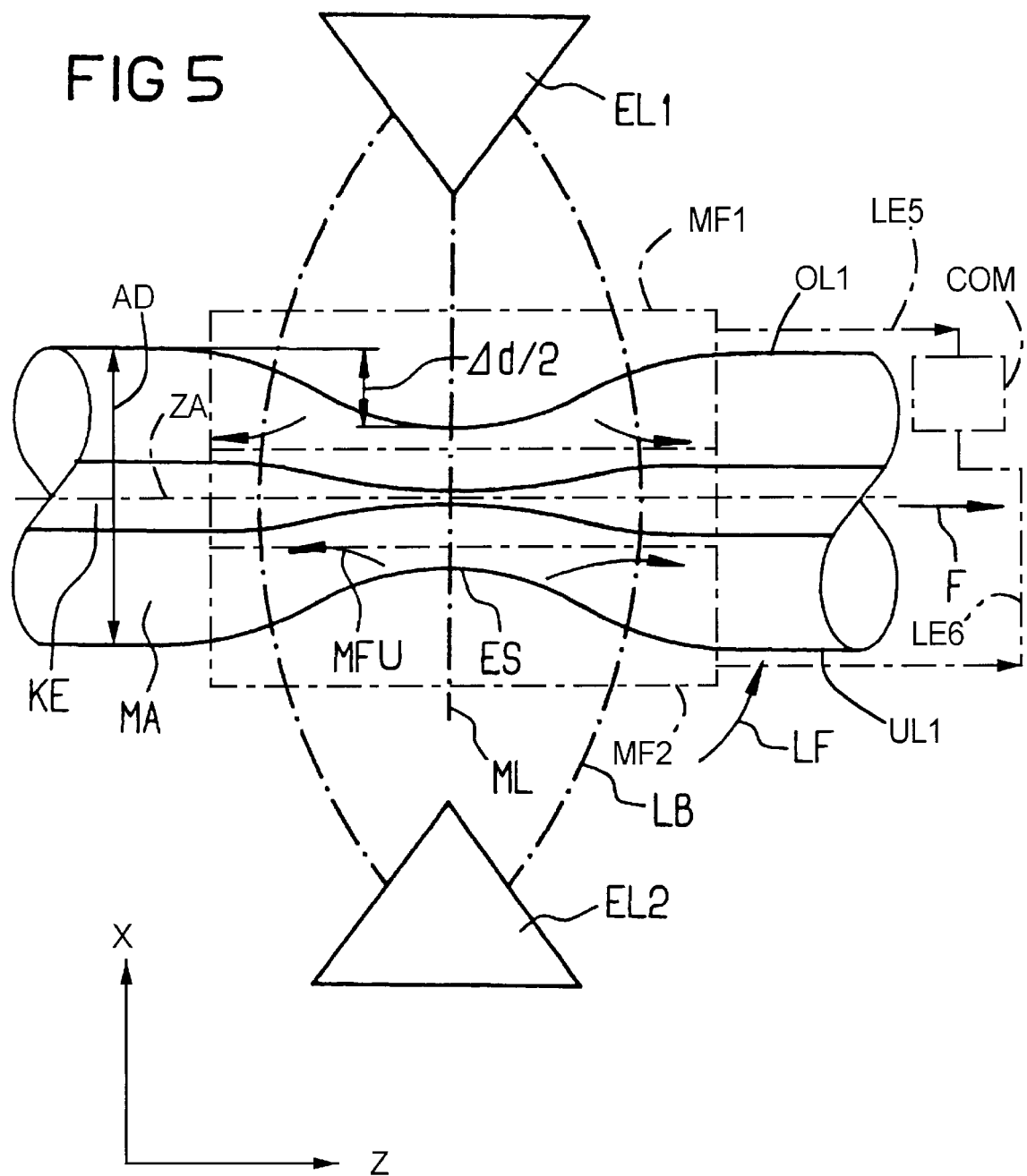
FIG. 5 a schematic as well as magnified view of the constriction of a test optical fiber section during the implementation of the inventive method.

Schematically as well as magnified, FIG. 5 shows an optical image of the test optical fiber section or, respectively, test fiber LF in the region between the two electrodes EL1, EL2 in the x-z plane of observation by way of example. In addition, the course of the fiber core (core) of the test optical fiber section is also entered therein and provided with reference character KE. The fiber core (core) KE proceeds essentially centrally in the inside of the cladding glass (cladding) MA of the test fiber LF. The central axis ZA of the test fiber LF is likewise entered dot-dashed. Viewed spatially, the optical test fiber LF thus exhibits an essentially circular-cylindrical fiber core KE in its center on which the cladding glass MA is seated as an approximately circular-cylindrical coating.

The test fiber LF is locally heated, particularly melted and softened as a result, in the arc region LB (entered dot-dashed) due to the glow discharges between the two electrodes EL1, EL2. Since the optical fiber LF thereby continuously resides under a prescribable, defined tensile stress F along its axial longitudinal extent, the softened glass material of the test fiber LF that has been rendered viscous is pulled apart in the axial longitudinal direction. The material flow MFU (indicated with arrows in FIG. 5) of the melted glass material of the test fiber LF rendered resilient thereby occurs in longitudinal fiber direction at both sides away from the center line ML (entered dot-dashed) of the arc region LB. A thinning of both the fiber core KE as well as of the fiber cladding MA thereby arises in the heating region of the arc LB. The outside diameter of the optical fiber LF thus decreases in the arc region LB between the two electrodes EL1, EL2, i.e. a constriction or, respectively, taper of the outside circumference thereof forms thereat in the longitudinal course of the test fiber LF. In the x-z-plane of observation of FIG. 5, the two long sides of the test fiber LF constricted in the arc, or respectively, welding region LB respectively comprise an essentially parabolic outside contour that is formed axially-symmetrically relative to the center line ML. The constriction is referenced ES in FIG. 5. Viewed in radial direction (with reference to the central axis of the test fiber LF) along the central line ML, an overall reduction of the outside diameter by $\Delta d$ compared to the original outside diameter AD of the test fiber LF, which this comprises outside the arc region LB, occurs due to the constriction. $\Delta d$ thus indicates the overall reduction in the outside diameter effected in the constriction region. Δd/2 in FIG. 5 consequently identifies the radial constriction or, respectively, lowering depth of the outside contour of the test fiber LF in the constriction region ES compared to the outside contour of the test fiber LF outside the heating region LB. The degree of constriction—preferably expressed by the outside diameter reduction Δd—can then be advantageously utilized as a criterion for the fiber viscosity produced in the heating, particularly melting of the test optical fiber section. In particular, the glass viscosity that is required for an optimum welding of two optical fibers corresponds to a specific radial constriction depth. This predetermined rated constriction has, in particular, a specific welding current strength (see IS in FIG. 1), welding duration, electrode spacing as well as other welding parameters allocated to it under the respectively existing welding conditions (such as, for example, atmospheric moisture, air pressure, air temperature, fiber type, electrode spacing, etc.), so that a specific set of welding or, respectively, splicing parameters can be set for a desired, optimum fiber viscosity.

In addition to or independently of the direct determination of the reduction of outside diameter, it can be especially expedient to utilize the change in intensity value within at least one measuring window—from which the outside contour of at least one of the two long sides of the test optical fiber section is acquired at the heating location EZ—as test criterion for the constricting effect of the respective heating or, respectively, welding process. A first measuring window MF1 (indicated dot-dashed in FIG. 5) is allocated to the outside contour OL1 of the upper, illustrated long side of the test optical fiber section LF. It is rectangularly fashioned and has its long sides extending preferably approximately parallel to the central fiber axis ZA of the stretched test fiber LF. it is preferably a component part of the image sensor of the image processing system VK of FIG. 1 or, respectively, 6. The measuring window MF1 thus preferably determines an image excerpt in the respective plane of observation wherein the intensity values of the individual pixel elements are utilized for evaluation. The intensity values of the individual pixel elements are read out from this rectangular image excerpt with the assistance of the evaluation/control means COM. The sum of all those picture elements, i.e. pixels, within the measuring window MF1 that appear bright compared to the fiber image LF is preferably determined with the assistance of the evaluation/control means COM. All of those picture elements within the measuring window MF1 whose intensity values respectively lie above a determined brightness threshold are preferably counted. This brightness threshold is expediently selected such that an unambiguous distinction between picture elements of the test fiber image dark and the other picture background of the x-z-plane of observation appearing bright is enabled. The respective cross sectional taper is all the greater the greater the plurality of bright picture elements in the measuring window MF1. The brightness modification that potentially occurs after the respectively undertaken heating or, respectively, welding process thus forms a criterion for the fiber taper that has been effected.

In order to also be able to acquire a potential shrinkage of glass material in the region of the lower long side of the test optical fiber section LF at its heating location in the x-z-plane of observation of FIG. 5, a second rectangular measuring window MF2 is correspondingly allocated to the outside contour UL1 of the lower longitudinal fiber side. This second measuring window MF2 is likewise indicated dot-dashed in FIG. 5. With respect to the central axis ZA (entered dot-dashed) of the test optical fiber section LF, it is aligned essentially axially symmetrically relative to the first measuring window MF1. The second measuring window MF2 also preferably bounds an image excerpt of the image sensor of the image processing system VK of FIG. 1.

Of course, it can also be expedient to provide respectively independent, light-sensitive elements as measuring windows MF1, MF2. Further, it can also be potentially expedient to identify the aggregate sum of the intensity values of the individual picture elements within the respective measuring windows MF1 or, respectively, MF2, and to utilize the modification of this aggregate intensity sum as criterion for the fiber taper. The evaluation possibility of the respective measuring window MF1 or, respectively, MF2 by the evaluation/control means COM is indicated in FIG. 5 in that the first measuring window MF1 is connected to the control/evaluation means COM via a data line LE5 (dot-dashed) and the second measuring window MF2 is connected to the control/evaluation means COM by a data line LE6 (dot-dashed).

The following procedures can, in particular, be expedient for the automatic determination of optimum welding parameters. In particular, the evaluation/control means COM of the splicing device of FIG. 1 thereby preferably evaluates the time curve of the discharge current strength IS and advantageously places this into relationship with the respectively effected, radial constriction depth Δd/2.

1. When an optimum set of welding parameters are to be identified, for example for two light waveguides of the same type to be welded to one another, then one of the two light waveguides such as, for example, LW in FIG. 1 is expediently placed into the splicing device. The light waveguide to be inserted was thereby previously decoated along a sub-section, i.e. its plastic coating was stripped, so that its bare optical fiber such as, for example, LF is exposed thereat. The light waveguide such as, for example, LW of FIG. 1 is placed under a defined tensile stress F along its exposed optical fiber section such as, for example, LF with the assistance of a traction testing means. With the assistance of a heating device such as, for example, the two electrodes EL1, EL2 of FIG. 1, the bare optical fiber section is heated at one or more longitudinal locations given a permanently set welding parameter set, being particularly incipiently melted. The variation of the outside fiber diameter at the respective heating location is thereby measured. This, in particular, can ensue in an optical way with the optical image processing system VK of FIG. 1. The respective constriction depth achieved with predetermined welding conditions as well as the existing, as yet not optimized welding parameters can then be utilized for determining optimum welding parameters for the actual production of a light waveguide weld.

It can be expedient to merely preheat the optical fiber residing under tensile stress at the respective measuring location only until a constriction becomes visible, particularly measurable, at all. With reference to discharge current strength/time diagrams IS/t, FIGS. 2 through 4 schematically show three different possibilities of how the optical fibers can be pre-heated to such an extent by an appropriate selection of the time curve of the discharge current strength IS until a first constriction occurs at all.

a) According to FIG. 2, a pre-heating of the tensed optical fiber LF in the region of the respective measuring location can be achieved with the assistance of a sequence of heat pulses, particularly glow discharge pulses, whose correspondingly allocated welding current pulses IP1 through IPn are entered in FIG. 2. The welding current strength IS of these welding current pulses IP1 through IPn increases successively viewed over the time t, i.e. the welding current strength is increased in steps from one welding current pulse to the chronologically next welding current pulse. The welding current pulses IP1 through IPn are respectively schematically indicated in the form of a narrow rectangle in FIG. 2. Expediently, the current intensity of the starting heat pulse, i.e. of the first arc pulse IP1 here, is selected so low that the fiber temperature caused by the arc pulse is not yet adequate for triggering the constriction effect and does not lead to fiber rupture in any case. The welding current pulses IP1 through IPn preferably respectively comprise a pulse length PL of approximately the same size, i.e. constant.

The chronological spacing, i.e. the dead time TZ, between two respectively chronologically following, neighboring welding current pulses such as, for example, IP2, IP3 is likewise essentially constant. In that a time sequence of discrete, i.e. individual glow discharge pulses is output onto the test optical fiber section at the respective measuring location and the welding current strength IS of these glow discharge pulses is successively increased, the optical fiber-is heated to a greater and greater extent in the region of the measuring location in a precisely dosed way until, finally, a modification, particularly reduction of the outside circumference of the optical fiber, initially occurs at all, i.e. the beginning of a constriction in the initial stage can be found for the first time. A constriction becomes visible at all for the first time in FIG. 2 after outputting the pulse IPn with the appertaining discharge current strength IM2, i.e. the optical fiber only begins to constrict at all beginning from this point. What this means in other words is that the glass material of the optical fiber is softened to such a extent beginning from this point in time tE2 that a flow of material first occurs at all under the continuing influence of the predetermined tensile force F. An optimized welding parameter set for the later welding, particularly what is referred to as pre-welding, of two respective light waveguides to be actually connected to one another can then be particularly acquired from the current intensities of the discharge current pulses IP1 through IPn, their pulse length, the dead time TZ between two respectively successive current intensity pulses, the point in time tE2 that marks the beginning of the constriction effect, as well as the predetermined tensile force F. In particular, the pre-welding duration as well as the pre-welding current intensity can be derived therefrom. What is particularly understood by pre-welding in light waveguide welding technique is a preparatory measure wherein the fiber ends of two light waveguides to be connected to one another exhibit a defined longitudinal spacing from one another with respect to their fiber cores and are pre-heated, particularly merely superficially melted, for end-face "melt gluing", i.e. contacting. Only thereafter are the fiber ends attached to one another at their end faces thoroughly heated in what is referred to as the main welding process such and fused to one another that the actual, tensile weld arises.

b) It can also be expedient to pre-heat the stretched optical fiber with a continuously increasing, particularly linearly rising welding current IS in the region of the respective measuring location. The current intensity/time diagram of FIG. 3 illustrates this. Therein, the current intensity IS rises continuously to point in time tE3 until a constriction effect occurs for the first time. The continuously rising curve is thereby referenced AI At time tE3, the glow discharge between the two welding electrodes exhibits the welding current intensity IM3. Expediently, the initial current intensity is selected so low that the fiber temperature caused by the arc pulse is not yet adequate for triggering the constriction effect and does not lead to fiber rupture in any case.

c) In addition to or independently of the time sequence of individual glow discharge pulses according to FIG. 2, it can also be expedient to output a sequence of glow discharge pulses onto the measuring region of the optical fiber whose pulse length is successively increased until a measurable constriction initially appears at the outside circumference of the optical fiber. The current intensity/time diagram of FIG. 4 schematically illustrates such a time sequence of glow discharge pulses. Given an essentially constant discharge current intensity IM4 of all discharge current pulses, the pulse length, i.e. pulse duration IP, is first increased in steps from one glow discharge pulse to the chronologically next glow discharge pulse, so that the thermal output emitted onto the optical fiber is increased in steps. The pulses thereby follow one another at approximately the same time spacing ZA. Expediently, the pulse length of the starting arc pulse PU1 is selected so low that the fiber temperature effected by the arc pulse is not yet adequate for triggering the constriction effect and does not lead to fiber rupture in any case. Its pulse length is lengthened until the constriction effect finally begins. In FIG. 4, this is point in time tE4 up to which K–1 glow discharge pulses with discharge current pulses PU1 through PUk–1 have been output.

Beginning with the point of time at which the constriction effect respectively begins, the optical fiber then continues to be heated at the respective measuring location until a defined prescribable constriction (such as, for example, $\Delta d/2$ in FIG. 5) is achieved. In particular, that time duration can then be employed as measuring criterion for the constriction effect of the respective welding process that is required, proceeding from the original outside diameter AD of the test optical fiber section LF, i.e. from the beginning of a measurable constriction effect, is required for achieving a prescribable, radial, rated cross sectional reduction. The predetermined rated cross sectional reduction is thereby expediently defined such that an optimum fiber viscosity in the actual welding of two respective optical fibers is allocated to it.

In order to achieve the predetermined rated constriction, particularly reduction of outside diameter, it can be particularly expedient, according to FIG. 2, to output glow discharge pulses with discharge current pulses IPn+1 through IPm of a constant pulse length as well as constant discharge current intensity IM2 onto the optical fiber beginning from point in time tE2 until point in time tA2 at which a desired radial, rated constriction depth $\Delta d/2$ is achieved. The discharge current intensity of the pulses IPn+1 through IPm thereby particularly essentially corresponds to the discharge current intensity IM2 of the welding current pulse IPn at which the constriction effect had just begun.

In the pulse sequence according to FIG. 4, too, only glow discharge pulses whose current discharge pulses PUk through PUn exhibit essentially the same discharge current intensity IM4 as well as the same pulse lengths as the discharge current pulse PUk–1 at which the constriction effect just begins for the first time at time tE4 are output onto the respective measuring location of the optical fiber. The pulse sequence ends with the discharge current pulse PUn at time tA4 at which the desired, rated constriction depth $\Delta d/2$ is achieved.

According to FIG. 3, it can be just as expedient to generate a continuous glow discharge beginning with time tE3 at which the constriction effect occurs for the first time, the welding current intensity IS of this continuous glow discharge being essentially constant and preferably corresponding to the welding current intensity IM3 at time tE3 when the constriction effect begins. The constant curve of the discharge current beginning with time tE3 is referenced IK in FIG. 3. It ends at time tA3 when the respective preset, desired constriction depth is reached.

The time progression of the constriction and, thus, the increase of the constriction depth with increase of the heat quantity or, respectively, thermal capacity output onto the respective measuring location is expediently continuously logged, for example by optical measurement with the optical imaging system VK of FIG. 1.

Beginning with the point in time such as, for example, tE2 in FIG. 2 from which a constriction begins for the first time, an optimized set of welding parameters for, preferably what is referred to as the main welding of two light waveguides to be connected to one another can be derived or, respectively, determined from the measured quantities such as, for example, constriction depth, tensile stress, welding current, welding time etc.

Viewed in summary, thus, an optimized set of welding parameters (particularly for the pre-welding and/or main welding) can be automatically determined with the evaluation/control means COM from the values for the tensile stress F, the constriction depth Δd/2 achieved, the welding current intensities employed, the pulse durations for the welding current pulses, the dead times between two chronologically successive welding current pulses, etc., and can be stored thereat in the splicing device.

Before the optical fiber is heated, its fiber diameter is expediently measured at one or more longitudinal locations and this value is stored in the evaluation/control means such as, for example, COM of the splicing device. As a result thereof, a reference value is available for the outside diameter AD of the optical fiber, the constriction or, respectively, shrinkage of the outside contour of the heated optical fiber being compared thereto later.

It can be potentially expedient to repeat the above-described method one or more times in order to be able to undertake an averaging for one or more of the welding parameters.

It can also be potentially expedient to utilize that welding current IS as test criterion for the constricting effect of the respective welding process that is required proceeding from the original outside diameter AD of the test optical fiber section LF to achieve the prescribable, radial rated cross-sectional reduction.

2. It can be potentially expedient to also measure the light power level of test light (such as, for example, ML in FIG. 1) in addition to or independently of the method steps recited under 1., this test light being conducted in the test optical fiber section LF. In particular, what is referred to as the LID measuring method ("light injection and detection") as disclosed by U.S. Pat. No. 5,078,489 is suitable for this. Preferably, the light power level of the test light guided in the test optical fiber section LF is thereby already measured before the "tapering" (=constriction) of the optical fiber. The light power level is then continuously measured during the heating phase or respectively after every welding current pulse and, in particular, is continuously co-logged by the evaluation/control means COM of FIG. 1. As warranted, an abort criterion for the taper of the optical fiber section can be derived from the registered light power level. The time curve of the light power level can thereby be co-involved in the determination of optimum welding parameters.

Figure 6:
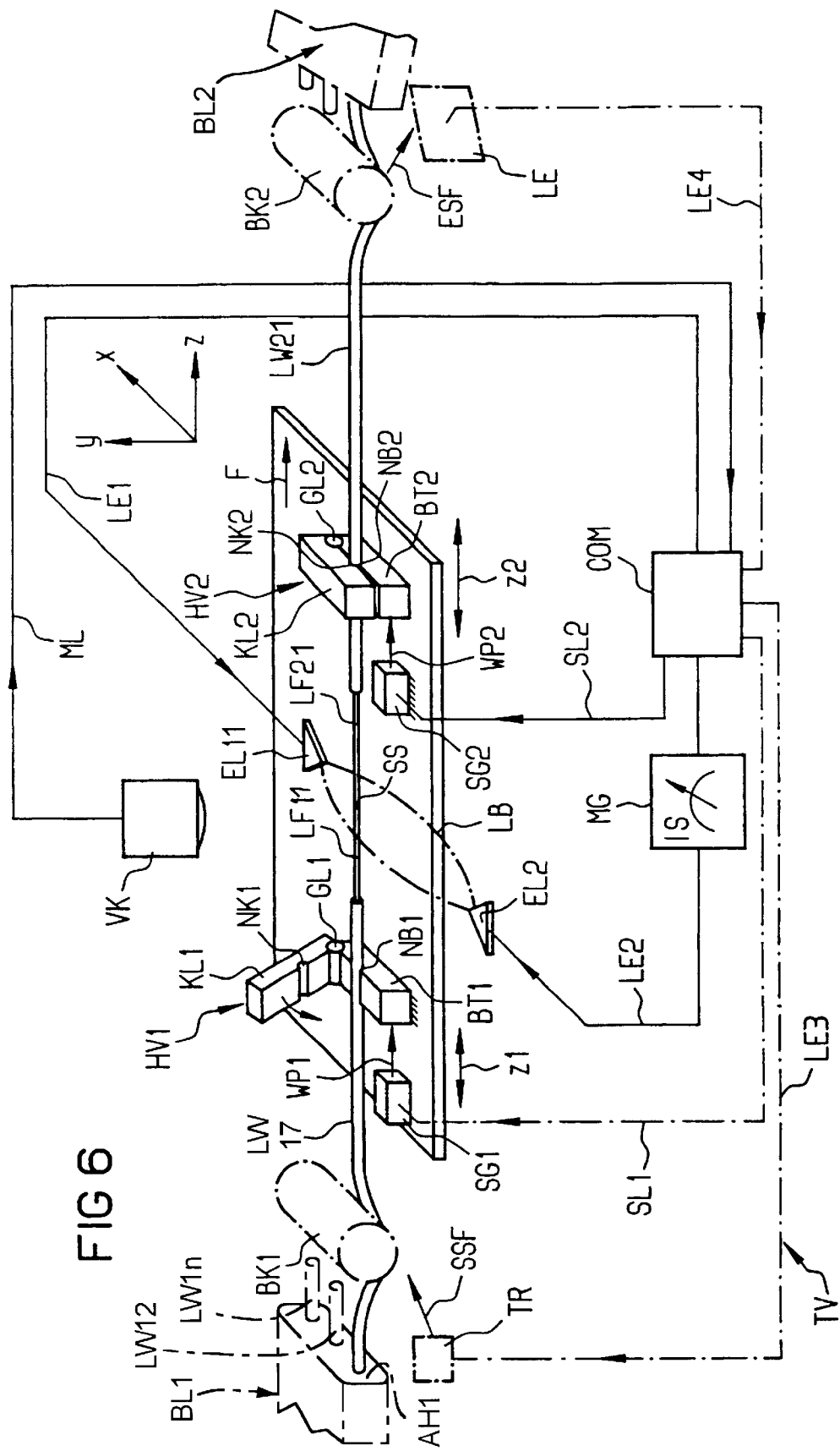
FIG. 6 a schematic, partially perspective illustration of the apparatus of FIG. 1 for the implementation of a further modification of the inventive method.

3. It can also be expedient to already place two light waveguides to be welded to one another into the welding device from the very outset, these being respectively decoated at their end sides. FIG. 6 illustrates this. Therein, a first light waveguide LW11 is inserted and clamped fast in the holding device HV1 of the test or, respectively, welding device TV. It is decoated along an end section, so that its optical fiber LF11 is exposed bear thereat. A light waveguide LW21 is positionally assured in a corresponding way by the holding device HV2. It is decoated at its end side, so that its optical fiber LF21 is exposed bear thereat. The two optical fibers LF11, LF21 are brought into contact with one another at their end faces and welded to one another, so that a joint SS is formed between the two end faces of the optical fibers LF11, LF21. In this way, a continuous optical fiber corresponding to LW of FIG. 1 is produced by welding two fiber ends. The welding parameters thereby employed are as yet not optimized. Only subsequently are the method steps recited under 1. and/or 2. implemented for checking and adapting the splicing parameters. Given an acceptable attenuation, this slightly "tapered" test splice can already be co-incorporated as warranted into the main memory of the evaluation/control means for regular splice attenuations. As a result thereof, the additional manual outlay of a test splice can, in particular, be potentially illuminated. Otherwise, the two optical fibers LF11, LF21 welding to one another are separated from one another (given non-optimized splicing parameters), their ends are again prepared and, finally, their welding with optimized splicing parameters is then implemented.

4. It can be expedient to implement a plurality of test splices and to average the parameter sets that are thereby respectively acquired. When, moreover, it is found given a plurality of implemented test splices that the fiber viscosities change, then conclusions can, in particular, be made about the electrode condition of the splicing device. As warranted, the user can be automatically requested, for example, with the assistance of the evaluation/control means COM, to change electrodes or clean them when these are contaminated or too highly worm.

5. For splicing different fiber types that exhibit glass properties deviating from one another, two separate taper trials are expediently implemented for optimizing the splicing parameters. In particular, the following two different procedures were successfully tested:

a) suitable parameter sets for each fiber type are determined by two separate trials corresponding to one of the possibilities recited under 1. through 3. Subsequently, the optimum parameters for the welding of the two different fiber types are derived from these parameter sets allocated to each fiber type.

b) the different fiber types are first welded without optimized welding parameters with a correspondingly high splicing current for an adequate tensile strength. Subsequently, the splice location is displaced in Z-direction in two steps at a right angle relative to the position of the heat source, particularly the two electrodes, such that the respective welding parameter set can be separately determined for each fiber type according to the possibilities under 1. through 3. The optimum welding parameters for the welding of these two different fiber types can then again be derived from the welding parameter sets for each fiber type.

Before one then respectively begins with the welding of respectively second optical fibers, an optimization of the welding conditions is advantageously implemented in the following way for the new, i.e. currently existing environmental and/or ambient conditions:

First, at least one preliminary trial is implemented for the respective, currently existing welding conditions in at least one test optical fiber section for determining an optimum welding parameter set. In this preliminary trial, the test optical fiber section is subjected to a defined tensile stress during a prescribable testing duration. During this tensile load, the test optical fiber section is heated in at least one longitudinal location that a constricting effect is produced thereat at the heating location at the outside circumference of the test optical fiber section under the continuing tensile stress. This constricting effect is acquired and utilized for optimizing the welding parameter set for the existing welding conditions. Only after this at least one preliminary trial, is the weld of two respective optical fibers to be actually welded to one another produced with the identified, optimized welding parameter set. The various versions of the inventive method for determining optimum splicing parameters are particularly distinguished in that the relationship of fiber viscosity to the welding current employed can be determined given relatively low temperatures. As a result thereof, an overheating of the optical fibers and the disadvantages connected therewith such as, for example, evaporation of the glass material of the respective optical fiber and an electrode contamination resulting therefrom, can be largely avoided. Further, the inventive method can already be advantageously realized with the components already present in standard splicing devices, i.e. an additional hardware is usually not required. In particular, the method for determining an optimum set of welding parameters already manages merely with a fiber positioning in the longitudinal fiber direction, i.e. a lateral fiber positioning, particularly perpendicular to the respective longitudinal fiber axis, is not required.

For this reason, the inventive method for determining and setting an optimum set of welding parameters can also be advantageously utilized in multi-fiber welding technique, particularly for welding light waveguide ribbons. In light waveguide ribbons, namely, the optical fibers are embedded in the plastic material of a shared ribbon padding that is seated on them and surrounds them on all sides. The optical fibers are preferably arranged in the ribbon cladding material essentially parallel to one another in a common positional plane. The optical fibers thus have a fixed spatial allocation relative to one another. A respective optical fiber ribbon can thus only be displaced as a whole; an x-y alignment of two light waveguide ribbons to be welded to one another is thus not possible at all or only possible with difficulty as a rule. For better illustration, FIG. 6 additionally indicates subsections of two such light waveguide ribbons BL1, BL2 dot-dashed. The light waveguide ribbon BL1 is allocated to the left-hand holding device HV1; the second ribbon BL2 is allocated to the right-hand holding device HV2. The ribbon cladding of the first ribbon BL1 is referenced AH1 and the plurality of light waveguides enveloped therein is referenced LW11 through LW1n. The light waveguides LW11, LW21 with which at least one preliminary trial is carried out for determining and setting an optimum welding parameter set—as recited, for example, under 3.)—are preferably a component part of the two light waveguide ribbons BL1, BL2.

Further, the inventive testing method advantageously enables the sets of welding parameters to be respectively automatically identified. As a result thereof, time-consuming and involved sequences of trials for determining optimum splicing parameters can be avoided.

A further advantage of the inventive method is particularly comprised therein that a continuous optical fiber or, respectively, two optical fiber ends continuously welded to one another are heat-treated in the welding region. Expressed in other words, this means that the determination of the welding parameters is essentially implemented at the same test subject as well as under the same welding conditions as the later, actual weld between two respective light waveguides to be connected to one another. The particular advantage of the inventive method is thus comprised therein that the conditions as in the production of a normal weld are simulated. The same mechanisms or, respectively, effects thus take effect and can be evaluated in the determination of the splicing parameters as are present in the production of the actual weld and that are the deciding factor for the splice attenuation given a normal splice.

Viewed in summary, thus, it is advantageously possible to determine an individually adapted set of welding parameters for different welding conditions (such as, for example, atmospheric moisture, air pressure, fiber type, electrode condition, etc.), so that an optimum glass viscosity can be achieved during the welding process. Such a set of welding parameters adapted to the respectively existing welding situation can, expressed simplified, ensue indirectly via the measurement of the constriction depth of a test optical fiber or of a test splice dependent on the splicing current intensity, welding time employed as well as tensile stress under which the test optical fiber or test splice resides.

In the ideal case, the optimization of the splicing parameters can already be implemented on the basis of a single test splice. However, it can also be potentially expediently for a more precise setting of the set of welding parameters to implement a plurality of test splices and to average the parameter sets acquired therefrom.

Further, the inventive method works with extremely low heating temperatures, so that undesired evaporations of glass material of the test optical fiber section are largely avoided. As a result thereof, the electrode is largely clean. Further, largely custom properties of the arc are thereby also assured. In particular, it essentially retains its geometrical shape.

In this way, it is possible to adapt at least one of the welding parameters critical for the respective welding process (such as, for example, welding current intensity, welding duration, etc.) under a multitude of practical conditions to the respectively currently existing welding conditions (such as, for example, air pressure, atmospheric moisture, air temperature, optical fiber type employed, electrode condition, etc.) in a simple as well as reliable way. Possible quantities determining a quality of the weld can thus be comprehensively involved. Changing or, respectively, different welding conditions can thus be taken into consideration, i.e. the setting of welding parameters can thus be undertaken in a simple way such that an optimally good weld largely independent of environmental and/or ambient influences is produced between two respectively optical fibers. In this way, the splice quality of thermal welds between at least two optical fibers can be rather substantially improved.

Viewed in summary, both a decoated, continuous fiber section of the light waveguide to be respectively welded can be itself employed as test optical fiber section. On the other hand, a fiber section of a separately provided test fiber can also be employed as warranted as test optical fiber section. A fiber type that optimally corresponds to the fiber type of the light waveguides to be actually welded to one another later is preferably selected for such a test fiber. Finally, it can also be expedient to form the respective test optical fiber section by "normal" welding of two optical fiber ends, to which end their optical fibers were brought largely into alignment with one another with respect to their outside contours.

When a defined tensile stress is exerted on the respective test optical fiber section and a region of its tensed longitudinal section is brought into the heating region of an arc in order to trigger the constriction effect, then the problem can arise in practice that the test optical fiber section under tension is too quickly reduced in cross-section in its heating region and a fiber rupture thus quickly occurs. When heating with the ignited arc, thus, the viscosity of the test optical fiber section can be reduced too greatly and too rapidly at its heating location. Expressed in other words, this means that the observation time span for the constriction event begun with the triggering of the constriction effect can be too short up to fiber rupture and, due to the excessively slight dynamics of the constriction event caused as a result thereof, the practical evaluation thereof is not possible without further ado. If, for example, the arc were continuously output onto the test optical fiber section with the lowest welding current of approximately 10 mA that can be set in standard light waveguide welding devices, then fiber rupture would already occur at its heating location after a time span of less than 500 ms given the assumption of a work location height of approximately 500 m NN (=over normal 0), this being too short in practice for the analysis of the constriction event.

So that an evaluation of the constriction event becomes in practice, the heating of the test optical fiber section is advantageously undertaken such that the fiber temperature at its heating location is reduced compared to a traditional, continuously implemented heating procedure. To that end, an arc pulsed with a prescribable frequency is expediently output onto the respective heating location of the test optical fiber section. The control of the pulse emission can thereby expediently ensue with the assistance of the evaluation/control means COM of FIG. 1 or, respectively, 6 that correspondingly drives the electrodes EL1, EL2 via the control lines LE1, LE2. The test optical fiber section or, respectively, the test fiber is thereby heated only in a time span of such a length while the arc is ignited and can in turn cool with the subsequently deactivated arc. A plurality of heat pulses in chronologically successive heating intervals with intervening dead times thus act on the test fiber. FIG. 2, 4 and 11 illustrate various time sequences of such heat pulses. In that a time pause such as, for example, TZ in FIG. 2 or FIG. 11 is observed between two respectively succeeding heat pulses, the test fiber is given a possibility to cool in this way, a constantly low temperature load on the test fiber derives compared to a traditional, continuously implemented heating or, respectively, welding process. As a result of the alternation between heating and cooling phases, the viscosity of the molten glass material of the test fiber can be reduced and, thus, a chronologically slower tapering of the fiber cross-section can be achieved, as a result of the pulses mode of the arc such as, for example, LB between the two welding electrodes EL1, EL2 of FIG. 1, thus, the constriction or, respectively, taper of the test fiber cross-section can be influenced in a designated way such that the constriction process or, respectively, tapering process of the test fiber is lengthened in time or, respectively, time delayed, i.e. can be broken into many small individual tapering steps, so that an adequately long observation time span is available for the evaluation of the overall constriction event. Observation time spans preferably between one minute and ten minutes, particularly between one and four minutes, preferably of about three minutes could be achieved in practical trials in this way. The time spread of the constriction event can be effected and influenced by appropriate setting of the pulse duration during which the arc is activated, the pause duration or, respectively, dead time during which the arc is deactivated and/or the welding current of the respectively output heat pulse is zero. In particular, the taper of the respective test fiber can be controlled, particularly regulated, by variation of the pulse time and/or pause time. Expressed in general terms, thus, the test fiber can be tapered in a precisely controllable way, i.e. in metered fashion, by appropriate triggering of the arc such as, for example, LB of FIG. 1 or, respectively, 6.

Since the tapering event is influenced by the same environmental and/or ambient conditions (such as, for example, air pressure, atmospheric moisture, air temperature, optical fiber-type employed, electrode condition, etc.) as in the normal welding of two respective optical fibers, it can be utilized as a simple and dependable correction quantity for adaptation, particularly optimization, of one or more welding parameters (such as, for example, welding current intensity, welding duration, electrode spacing, etc.) under the currently established welding conditions.

To this end, calibration test curves according to FIGS. 7–10 are first identified in order to be able to register the time behavior of the tapering event under different environmental and/or ambient conditions. In particular, the following procedure was successfully tested:

For the pulsed operation of the arc LB (see FIG. 1 or, respectively FIG. 6), the discharge current intensity IS for all output arc pulses is set to be constant values such as, for example, IS=KS (see FIG. 11). The temperatures that takes effect at the heating location such as, for example, EZ of the test optical fiber section such as, for example, LF of FIG. 1 is set by appropriate control, particularly regulation of the pulse duration of the respectively output heat pulse. The constant value is thereby fixed for the pause time or, respectively, dead time between two respectively successive heat pulses. FIG. 11 schematically illustrates the conditions of such a heat pulse sequence on the basis of a welding current intensity/time diagram. The time t is entered along its abscissa, whereas the welding current intensity IS is allocated to its ordinate. The heat pulses output are represented by corresponding welding current pulses HP1 through HPn. In a first approximation, a respective rectangular shape is assumed for the welding current pulses HP1 through HPn. The same constant welding current value IS=KS is allocated to each welding current pulse HP1 through HPn in FIG. 11. Whereas two respectively chronologically adjacent welding current pulses such as, for example, HP3, HP4 respectively follow one another with an approximately constant pause time TZ34=TZ=constant, i.e. with the same chronological spacing, the temporal length, i.e. time duration, of the individual welding current pulses HP1 through HPn varies. The regulation of the test fiber temperature here thus ensues via the pulse time in the exemplary embodiment. Of course, it can be just as expedient to produce a temperature regulation by corresponding variation of the pause time in addition to or independently thereof. In the present test example, a constant cooling time span of, preferably, approximately one second was defined for the pause times between the welding current pulses HP1 through HPn following one another spaced in time.

Expediently, the pulse length or, respectively, pulse time PL1 of the first heat pulse, i.e. starting pulse HP1, is selected so low that the fiber temperature effected by this first arc pulse does not immediately lead to fiber rupture. The pulse time PL1 of the starting pulse HP1 is preferably selected so slight that the fiber heating effected by it does not even suffice for the commencement of the constriction effect. In the following, first pause time TZ12=TZ=constant, the outside diameter of the test optical fiber section LF is determined at its heating location EZ with the assistance of the image processing system VK of FIG. 1 or, respectively, FIG. 6, particularly a video camera. This identified outside diameter value is compared to the original outside diameter AD (see FIG. 5) of the test optical fiber section LF before the heating thereof in the evaluation/control means COM of FIG. 1 or, respectively, 6, particularly by difference formation. As a result thereof, a potential fiber taper, reduction of the original outside fiber diameter, can be identified in a simple way. The reduction of the outside diameter AD (see FIG. 5) of the test optical fiber section LF at the heating location EZ can thus be utilized in the following pause time as test criterion for the constricting effect of every heat pulse that is output.

Subsequently, the time curve of the fiber tapering is acquired at a first, allocated location altitude H1 and is offered for evaluation. The location altitude is thereby identified by a specific air pressure value. This air pressure value can preferably be offered in a standard pressure chamber. In order to register a calibration measured curve that reflects the relationship between the fiber tapering and the plurality of output heat pulses at this air pressure value that represents a first altitude H1, the welding means TV of FIG. 1 or, respectively, 6 is expediently introduced into this pressure chamber together with the test optical fiber section LF. When a taper of the test fiber was not yet found in the pause time TZ12 after the first heat pulse HP1 (see FIG. 11) with the assistance of the image processing system VK of FIG. 1 or, respectively, 6 particularly a video evaluation means, then the pulse time, i.e. pulse length PL2 of the following, second heat pulse HP2 is lengthened compared to the pulse length PL1 of the first heat pulse HP1. A check to see whether a taper of the test fiber already derives is again carried out with the assistance of the video evaluation means of the welding device TV of FIG. 1 or, respectively, 6 in the pause time TZ23=TZ=constant following the second heat pulse HP2. The pulse times or, respectively, pulse lengths of the heat pulses are successively lengthened until a specific, previously determined cross-section reduction of the test fiber occurs. Beginning with that heat pulse from which a specific, predetermined and measurable cross-sectional reduction of the test fiber is initiated, i.e. triggered, for the first time, the pulse time of the following heat pulses is now regulated such that a prescribable, constant cross-sectional reduction of the test fiber respectively occurs per heat pulse. Expressed in general terms, thus, a plurality of heat pulses is controlled, particularly regulated, such that an essentially constant cross-sectional reduction of the test fiber, i.e. constant tapering of the outside diameter AD of the test optical section LF, is achieved at the heating location EZ per heat pulse. In the practical realization of the parameter optimization, a cross-sectional reduction of the test fiber of approximately 1 μm per heat pulse was the desired goal. The following table again illustrates the basic principle of pulse time regulation on the basis of an exemplary heat pulse sequence in order to achieve an approximately constant fiber cross-sectional reduction, i.e. a largely constant tapering of the test fiber, per output heat pulse:

Test Example:

Desired cross-sectional reduction=1 μm per heat pulse

| Starting Pulse | 70 ms | 0 μm |
| 2nd pulse | 120 ms | 0 μm |
| 3rd pulse | 170 ms | 0.1 μm |
| 4th pulse | 200 ms | 0.5 μm |
| 5th pulse | 220 ms | 1 μm |
| 6th pulse | 220 ms | 1 μm |
| 7th pulse | 220 ms | 1 μm |
| etc. | | |

The test example shows that the starting heat pulse is initially selected so low that a constricting effect does not yet occur and a fiber rupture most assuredly does not occur. The pulse time of the following heat pulses is then lengthened step-by-step until a measurable constriction of the fiber cross-section appears for the first time. In this test example, a measurable cross-sectional reduction of 0.1 μm is first acquired in the pause time following the third heat pulse. Beginning with this heat pulse from which a prescribable, measurable cross-sectional reduction of the test fiber occurs for the first time, the regulation of the pulse time is begun, namely to the effect that, in a first approximation, the constant fiber taper occurs per heat pulse output. In the present test example, the desired, constant cross-sectional reduction of 1 μm per heat pulse is achieved beginning with the fifth heat pulse output, with the pulse time as regulated quantity.

This typical time behavior of the pulse times is again schematically illustrated in FIG. 11. The pulse times of the heat pulses increase proceeding from the starting pulse HP1 up to the heating pulse HPk therein after which a measurable constriction effect at the test fiber occurs for the first time. The pulse times PLk+1 through PLm of the heat pulses HPk+1 through HPm following the heat pulse HPk then vary in order to assure the regulation to a constant fiber cross-sectional reduction per heat pulse output.

Figure 7:
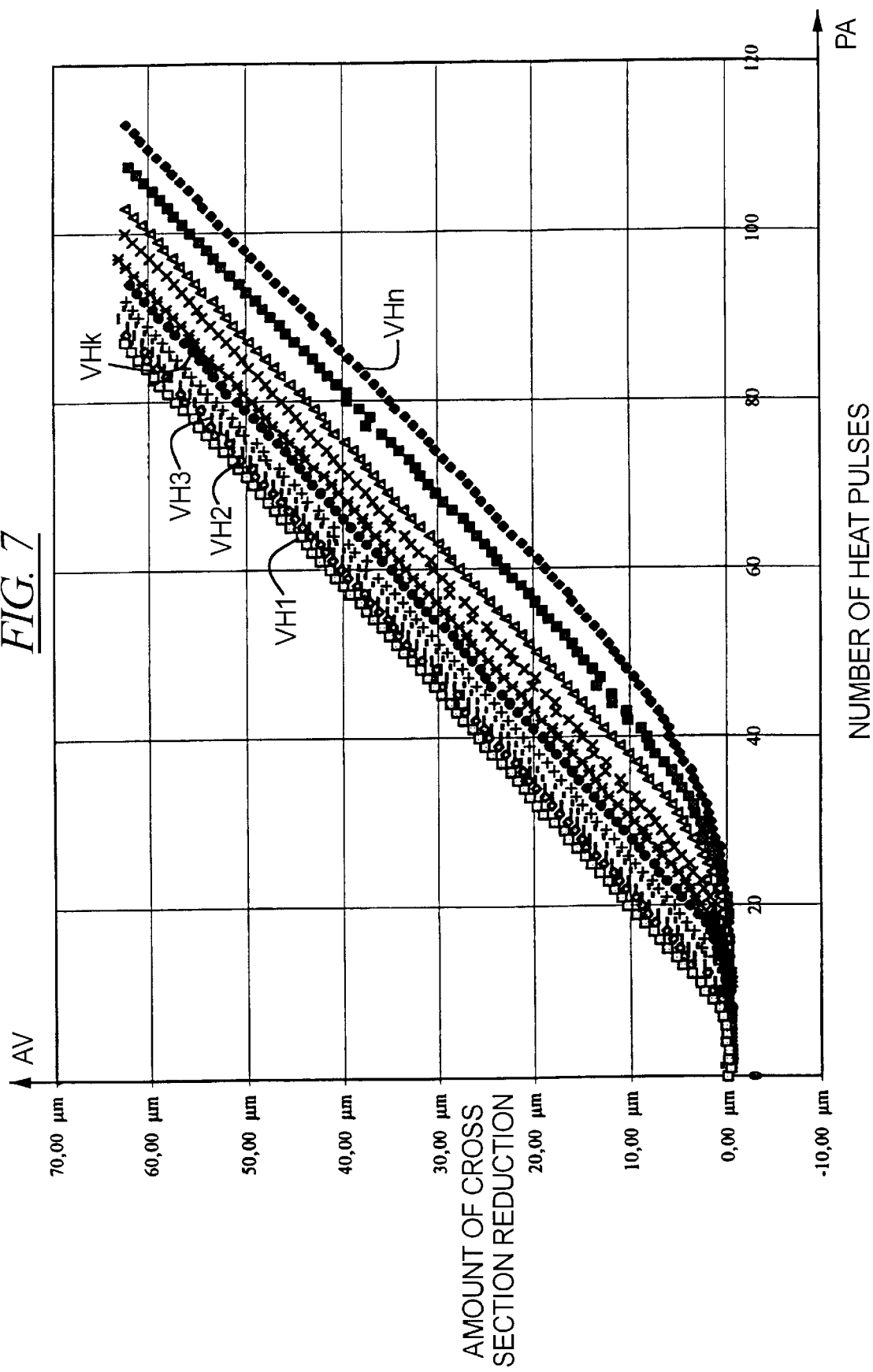
FIGS. 7 through 10 various diagrams that show an expedient, further possibility for the practical realization of the inventive method.

A first test series wherein the fiber cross-sectional reduction measured in the following pause time is allocated to each heat pulse output is then registered according to this regulation principle at the predetermined, first location altitude H1. FIG. 7 shows such a diagram along whose abscissa the number PA of the respective heat pulse is entered and along whose ordinate respectively allocated cross-sectional reduction or, respectively, tapering AV is entered. The test series VH1 derives for the first, simulated location altitude H1. Every measured tapering value of the test fiber is thereby identified by a small, blank square. In a fashion analogous to the first test series VH1, further test series VH2 through VHn can be registered for further location altitudes H2 through Hn increasing by steps. In FIG. 7, the test series VH1 is allocated to a first location altitude H1, the test series VH2 is allocated to a next-higher location altitude H2>H1, the third test series VH3 is allocated to a yet greater location altitude H3>H2>H1. The test series VHn, finally is allocated to a location altitude Hn that is higher than the location altitude H1 through Hn−1 of the other test series VH1 through VHn−1. Hn>Hn−1>...>H2>H1 thus applies for the altitudes H1 through Hn at which the various test series VH1 through VHn of FIG. 7 were registered.

Viewed overall, a field of characteristics thus derives that reflects the dependency of the measured fiber cross-sectional reduction AV dependent on the respective heat pulse number PA. The measured cross-sectional reduction values of the respective test series are thereby respectively identified in FIG. 7 by the symbols such as, for example, crosses, triangles, minus signs, etc.

The registered test series VH1 through VHn of FIG. 7 respectively show the same typical course upon initial observation.

Practically no tapering AV of the test fiber occurs in the starting region of the respective test series. All test series VH1 through VHn thus exhibit a flat, particularly horizontally proceeding starting region along which no measurable cross-sectional reduction AV of the test fiber appears. In the present test example, this is the region between the first and twentieth heat pulse in a first approximation. After approximately the 40th heat pulse, the pulse length, i.e. pulse time, and, thus, the heating of the test fiber is great enough in all test series that a constant fiber tapering occurs per heat pulse output. After the 40th heat pulse, all test series VH1 through VHn thus proceed in the form of a straight line in a first approximation. For registering the calibration measured curves of FIG. 7 for various, simulated location altitudes H1 through Hn, the cross-sectional reduction values of at least 80 output heat pulses, preferably between 80 and 120 output heat pulses were respectively expediently identified. It can be expedient for practice to register the cross-sectional reduction values of so many output heat pulses until the original outside diameter of the test fiber has ultimately been reduced to approximately half.

Dependent on the allocated location altitude, the following relationship derives to the set series VH1 through VHn:

regularly the pulse time such that a constant tapering of the test fiber occurs per heat pulse output lasts all the longer the higher the location altitude is selected, i.e. the lower the barometric pressure becomes. All the more energy, namely, is required the lower the barometric pressure becomes with increasing location altitude in order to achieve the same heat effect as given a lower location altitude. In FIG. 7, the different test series VH1 through VHn therefore proceed approximately parallel to one another with their state line sub-section as well as offset relative to one another in abscissa direction. The straight line sub-section of the respective test series migrates all the farther toward the right the greater the appertaining location altitude becomes. The plurality of pulses to be output in order to be able to trigger a constricting effect at the test fiber for the first time, namely, becomes all the greater the higher the location altitude. The test series VH1 through VHn are offset in abscissa direction relative to one another with respect to their subsection proceeding approximately on a straight line. The reason for this is that the constricting event begins all the later the higher the location altitude, i.e. the lower the barometric pressure becomes. In FIG. 7, for example, a chronologically constant constricting effect already begins after approximately the 20th heat pulse in the test series VH1 for the lowest test altitude H1. Compared thereto, the test series VHn that is allocated to the greatest altitude Hn in the test example still proceeds largely horizontally even after the output of the 20th heat pulse since it was not yet possible to trigger a constricting effect.

Figure 8:
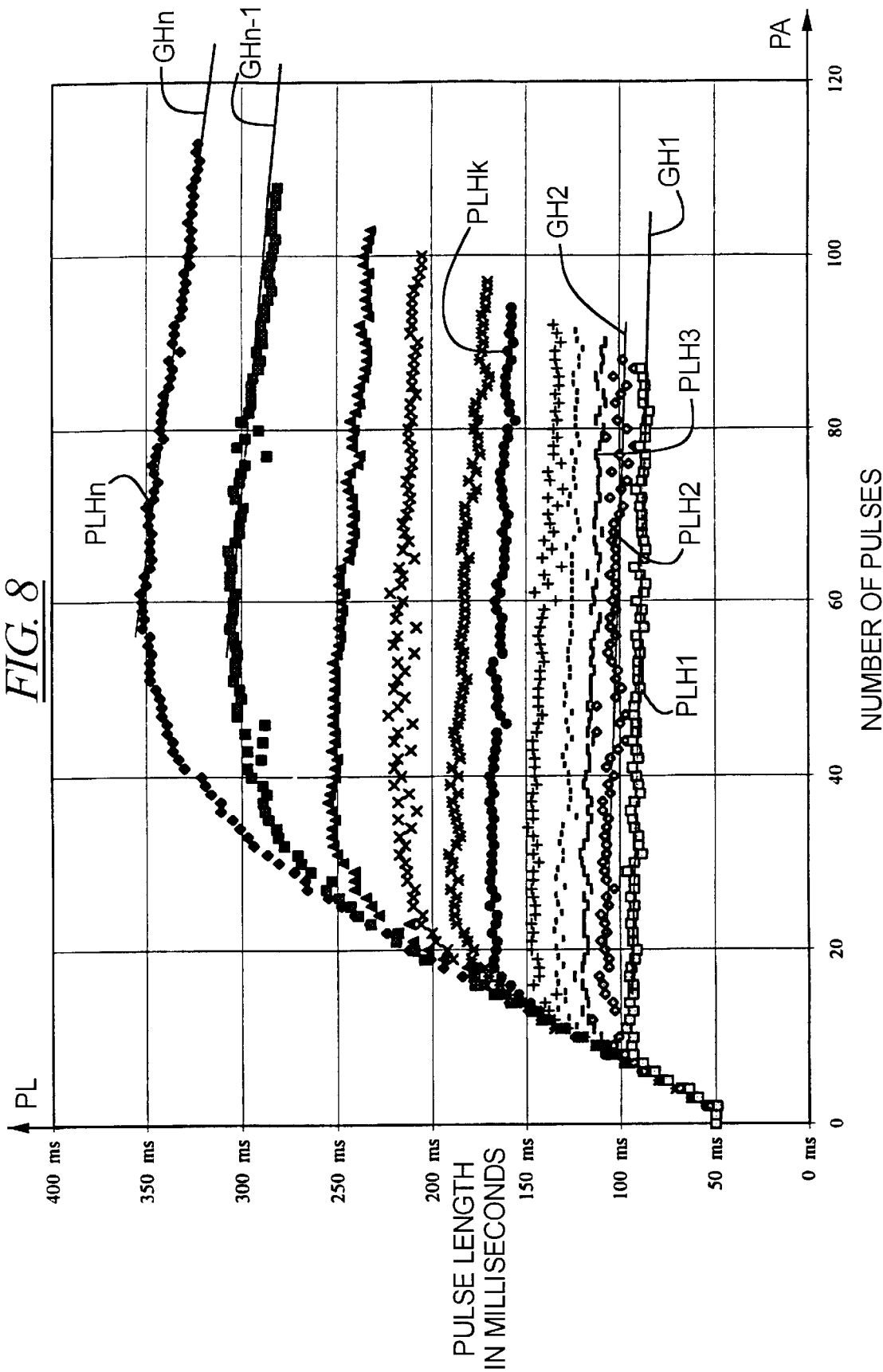

FIG. 8 shows an appertaining pulse time/pulse number diagram for the test series families VH1 through VHn of FIG. 7. The numbers PA of the output heat pulses are entered along the abscissa. These pulse number PA have appertaining heat pulse length PL allocated to them along the ordinate, these deriving in the practically realized control principle for generating a constant cross-sectional reduction per heat pulse. The test series for the pulse lengths of every output heat pulse are referenced PLHI through PLHn for the differently prescribed location altitudes H1 through Hn. In FIG. 8, the pulse times that are allocated to the same location altitude H1 through Hn as the appertaining measured cross-sectional reduction values AV of FIG. 7 are thereby provided with the same symbols. The pulse times for the first altitude H1, thus are identified with blank squares.

In FIG. 8, the test series PLH1 through PLHn for the pulse times PL of the heat pulse that are output likewise exhibit a characteristic curve:

The test series PLH1 through PLHn allocated to the various altitudes H1 through Hn first respectively steeply increase up to a maximum of the pulse length PL. After this maximum pulse time, each test series then merges into a flatly dropping straight line in a first approximation. The steeply rising initial curve of every test series stems therefrom that a specific plurality of output heat pulses are required in order to set a constant cross-sectional reduction per heat pulse output. After about the maximum of the respective test series PLH1 through PLHn, a constant fiber tapering then occurs per heat pulse output. The flatly decreasing, approximately straightline curve of the respective test series indicates that the pulse times of the output heat pulses regulated to a constant tapering in turn diminish. This can be explained in that a faster and faster heating of the test fiber occurs with decreasing fiber cross-section, i.e. the test fiber would be tapered all the more given constant pulse times the smaller its fiber cross-section becomes. This effect is compensated by a reduction of the pulse times in the regulation. The heat pulse sequence of FIG. 11 shows this again in a schematic illustration. Beginning with the heat pulse HPm up to the last heat pulse HPn, the pulse lengths PLm through PLn thereof slowly shorten.

The sub-sections of the test series PLH1 through PLHn of FIG. 8 that proceed approximately on a straight line are offset relative to one another in ordinate direction, i.e. respectively two neighboring measured curves such as, for example, PLH1, PLH2 exhibit a specific pulse time spacing PL from one another with respect to their sub-section proceeding on a straight line. The measured curves PLH1 through PLHn are thus separated from one another. This makes it possible to allocate a test series PLH1 through PLHn to every measuring altitude H1 through Hn in an unambiguous way. The lowest measured curve PLH1 thereby has the lowest measuring altitude H1 allocated to it. The second, next-higher test series PLH2 has the next-higher measuring altitude H2>H1 allocated to it, etc. The test series PLHn proceeding highest in FIG. 8, finally, is allocated to the highest location altitude Hn of the measuring altitude selected here in the test example. Expressed in general terms, the maximum and the adjoining, straight line sub-section of the respective test series PLH1 through PLHn lies all the higher the higher the measuring altitude becomes for the registration of the constricting event. The reason for this is that the temperature of the arc and, thus, the heating of the test fiber is dependent on the barometric pressure. All the more energy must be exerted in order to achieve the same fiber temperature the lower the atmospheric pressure is, i.e. the higher simulated measuring altitude becomes. Given the pulsed mode of the arc triggered to a constant cross-sectional tapering, a reduction of the barometric pressure is expressed in longer pulse times. So that the same tapering per heat pulse output can be achieved, a longer pulse time is required given lower barometric pressure. The pulse times of the test series PLHn at what is the greatest measuring altitude PHn in the test example are thus longest compared to the pulse times of the other test series. The pulse times of the respective test series become all the longer the higher the measuring. altitude.

It is also striking in the test series PLH1 through PLHn of FIG. 8 that their flatly decreasing sub-sections proceeding on a straight line in a first approximation lie essentially parallel to one another. After the maximum of the pulse times PL of the respective test series, a continuous straight line function is expediently acquired by function approximation for the following, registered measured pulse time values. Such an approximation straight line GH1, GH2 or, respectively, GHn−1, GHn is additionally respectively entered by way of example in FIG. 8 for the first two test series PLH1, PLH2 as well as the two last test series PLHn−1, PLHn.

Figure 9:
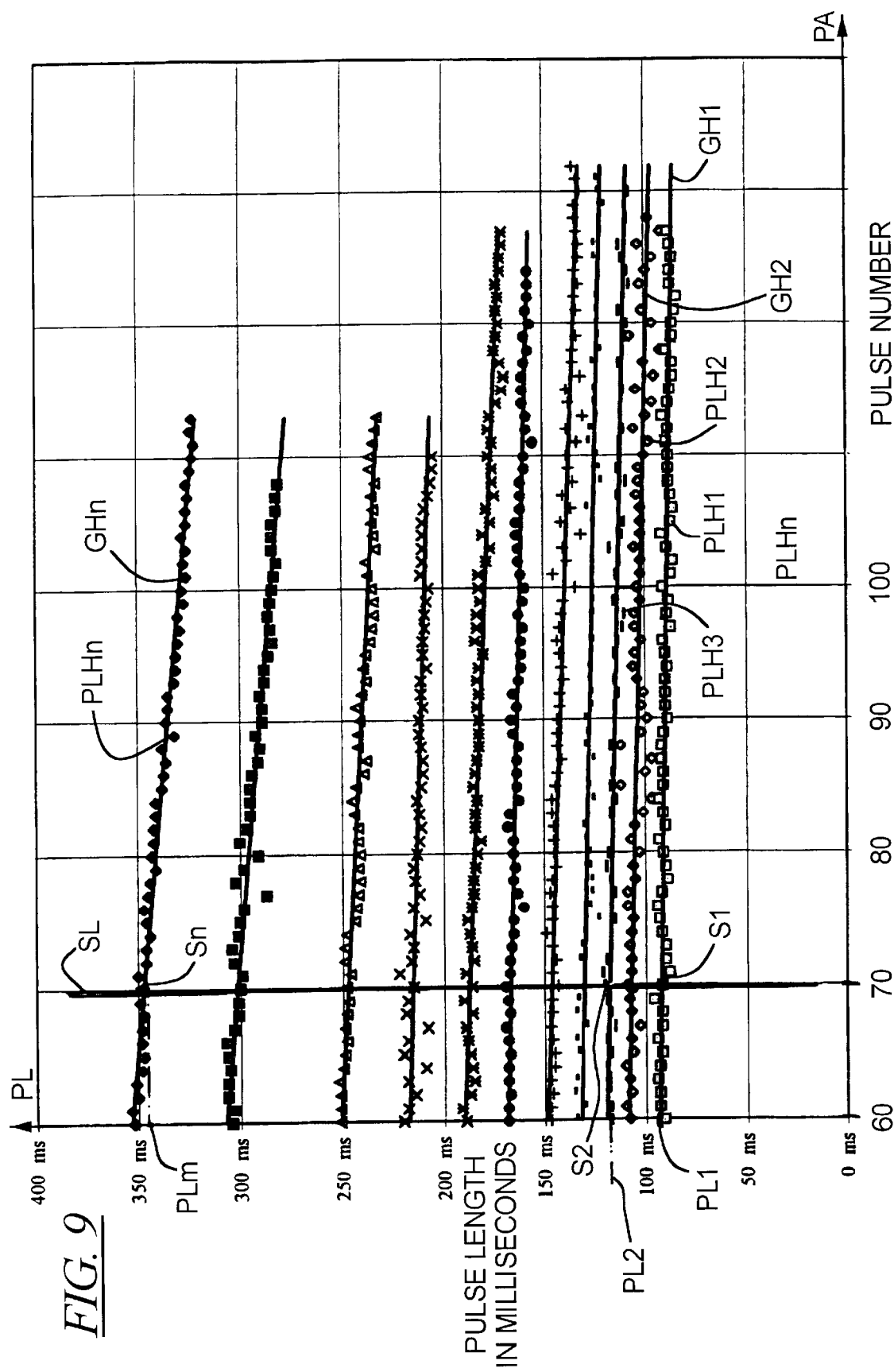

In a magnified illustration, the pulse time/pulse number diagram of FIG. 9 shows the right-hand half of FIG. 8 beginning from pulse number PA=60 with the sub-sections of the test series PLH1 through PLHn proceeding approximately straight-line. A relationship between pulse time and measuring altitude can then be derived from the test series PLH1 through PLHn, particularly the straight pulse time GH1 through GHn acquired by averaging. The straight-line sub-curve of the test series PLH1 through PLHn, namely, can be compared to one another in that the respectively same arc pulse mode was implemented with the same test criteria for the different measuring altitudes. In particular, only the pulse time was respectively varied for all test series, namely such that a constant fiber cross-sectional reduction was respectively assured per heat pulse output. The various straight pulse time lines GH1 through GHn differ from one another on the basis of different ordinate positions; it is therefore expedient to intersect the straight pulse time lines GH1 through GHn with a line SL that proceeds parallel to the ordinate PL and that is allocated to a fixed abscissa value. The intersecting line SL, for example, is defined at the pulse number PA=40. The line SL intersects the first straight pulse time line GH1 at the intersection S1. The altitude H1 as well as the pulse time PL1 is allocated to this first intersection S1. Correspondingly thereto, the altitude H2 as well as the pulse time PL2 is allocated to the intersection S2 between the second straight pulse time line GH2 and the intersecting line SL. In this way, a respectively appertaining pulse time PL1 through PLn can be allocated in an unambiguous way for every measuring altitude H1 through Hn for a defined abscissa value such as, for example, PA=40. In FIG. 9, the measured points S1 through Sn are thus allocated to the same abscissa location, i.e. the same pulse number, namely after a constant cross-sectional reduction per heat pulse output was achieved for every measuring series.

Figure 10:
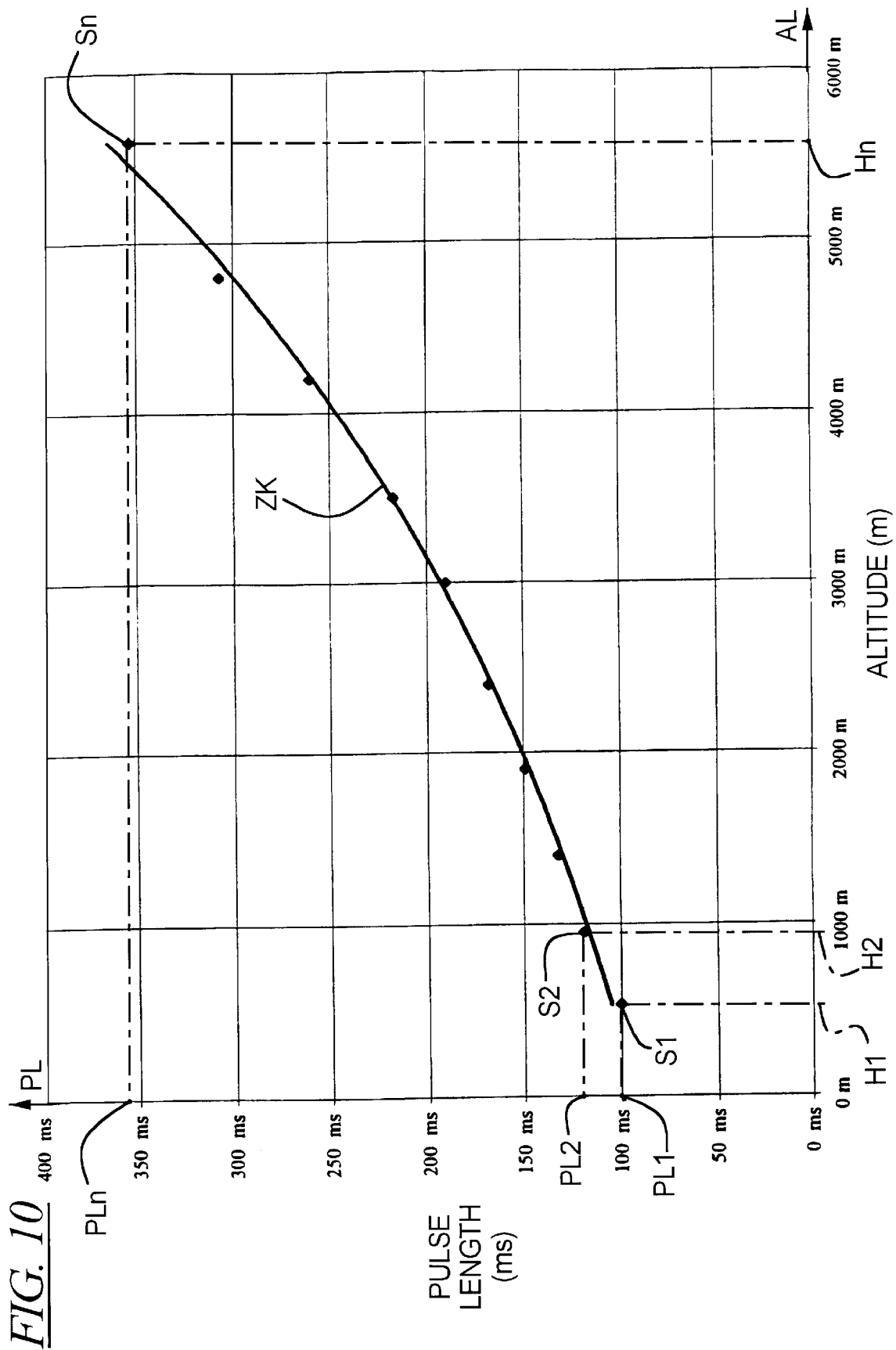

FIG. 10 show this allocation on the basis of a pulse time/measuring altitude diagram PL/AL. The respective altitude AL is entered along the abscissa and the allocated pulse time PL is entered along the ordinate. A specific altitude H1 through Hn as well as an appertaining pulse time PL1 through PLn is respectively allocated in FIG. 10 to every intersection S1 through Sn in FIG. 9. A pulse time curve ZK that reproduces the dependency of the pulse time on the measuring altitude can then be determined by function approximation for the individual measuring points S1 through Sn. For the present exemplary embodiment, the identified pulse time curve ZK corresponds to an e-function in a first approximation. The following relationship between the pulse time and the altitude can be read with the assistance of the identified pulse time curve ZK: the pulse time becomes all the longer the higher the altitude.

Expediently, only the individual pulse time curve ZK of FIG. 10 determined on the basis of the calibration measuring curves according to FIGS. 8, 9 is permanently deposited either as a formula or in tabular fashion in the evaluation/control means COM of the welding device TV of FIG. 1 or, respectively, 6 for the practical operating mode thereof. (The calibration measured curves according to FIGS. 7–10 serving for the determination of the pulse time curve ZK of FIG. 10 need not themselves be retained in the memory of the respective splicing device. Over and above this, new calibration measured curves no longer have to be registered given practical work with the splicing.)

Viewed in summary, the variation of pulse time at different measuring altitudes ultimately represents a change of the fiber temperature. Variations of the outside temperature, atmospheric moisture, electrode quality can likewise result in a variation of the fiber temperature that is in turn expressed by different pulse times. A specific altitude for the appropriate correction of at least one welding parameter, particularly the welding current, can then be factitiously allocated to the modified pulse time with the assistance of the pulse time curve ZK of FIG. 10.

Before one respectively begins with the welding of two respective optical fibers, and optimization of the welding conditions is advantageously implemented in the following way for the new, i.e. currently existing environmental and/or ambient conditions:

In at least one preliminary trial, at least one test optical fiber section is first subjected to a defined tensile stress during a prescribable testing time. During this tensile stress, the test optical fiber section is heated such at at least one longitudinal location that a constricting effect is produced thereat at the heating location at the outside circumference of the test optical fiber section under continuing tensile stress. In particular, a sequence of heat pulses (for example, corresponding to FIG. 11) is output onto the test optical fiber section according to the same method as used for determining the calibration measure curve according to FIG. 9 or, respectively, 10. The pulse time of these heat pulses is preferably regulated such that a constant tapering of the fiber cross-section occurs per heat pulse output. Given the respective, i.e. currently existing welding conditions, it is particularly the pulse lengths of those heat pulses after which an essentially constant diameter reduction of the test optical fiber section occurs per heat pulse output that is identified as test criterion. The same values as in the registration of the calibration measured curves are set for all other welding parameters such as, for example, dead time, welding current intensity. As a result, the pulsed operation of the arc, a pulse time test series can thus be registered in a way analogous to the test series of FIG. 8 or, respectively, 9. The pulse time that now newly derives is then read at the same pulse number as in the registration of the calibration measured curves of FIG. 8 or, respectively, 9, i.e. with the same abscissa value PA. With the assistance of the permanently stored calibration measured curve ZK of FIG. 10, a specific, imaginary altitude can then be allocated to this pulse time. With the assistance of the evaluation/control means of the welding device, finally, an adaptation of the welding current for the following, actual welding of optical fibers can be implemented from the altitude identified in this way. FIG. 12 schematically shows a correction curve KK for the welding current dependent on the fictitiously allocated altitude AL. The current correction factor ISK in order to achieve an optimum heating of the fibers to be welded to one another becomes all the greater the higher the fictitiously allocated altitude AL becomes.

Of course, it can also be expedient to make the pulse time curve ZK of FIG. 10 available to the user in paper form; the user can then respectively manually search the altitude matching the identified pulse time.

Given the inventive measuring principle, thus, the constricting effect of test optical fiber section residing under tensile stress can thus be exploited. Particularly by pulsing the arc, a time delay can be achieved for this constricting event, so that this can be registered over an adequately long observation time span. The constricting event can then be utilized for the optimization of at least one welding parameter, of the welding current here in the exemplary embodiment, given the specifically existing welding conditions. Only after this at least one preliminary trial, is the weld produced between the two respective optical fibers to be actually welded to one another, namely with the corrected welding parameter set, i.e. the welding parameter set adapted to the specifically existing environmental and/or ambient conditions.

In this way, thus, it is possible to adapt at least one of the welding parameters (such as, for example, welding current intensity, welding duration, etc.) critical for the respective welding process to the respectively currently existing welding conditions (such as, for example, barometric pressure, atmospheric moisture, air temperature, optical fiber type employed, electrode conditions, etc.) in a simple as well as reliable way under a multitude of practical conditions. Possible quantities determining a quality of the weld can thus be comprehensively co-involved. Changing or, respectively, different welding conditions can thus be taken into consideration, i.e. the setting of welding parameters can thus be undertaken in a simple way such that an optimally good weld between respectively two optical fibers is produced that is largely independent of environmental and/or ambient influences. The splice quality of thermal welds between at least two optical fibers can be rather substantially improved in this way.

What is claimed is:

1. A method for setting welding parameters for the production of thermal welds between at least two light waveguides in a welding apparatus, said method comprising the steps of:
   providing a welding apparatus having electrodes for welding two light waveguides together; and
   obtaining the welding parameters for the two waveguides by performing at least one test comprising:
      securing a test optical fiber section in the welding apparatus,
      subjecting the test optical fiber to a tensile stress for a testing duration,
      gradually heating a longitudinal location of the test optical fiber by increasing an amount of heat created by the electrodes of the welding apparatus to form a constriction with a reduction of the diameter of the fiber at the longitudinal location,
      determining the amount of the reduction of the diameter at the constriction, and
      utilizing the amount for setting at least one of the welding parameters.

2. Method according to claim 1, wherein a decoated, continuous fiber section of an optical waveguide to be welded is employed as test optical fiber section.

3. Method according to claim 1, wherein a fiber section of a separately provided test fiber is employed as test optical fiber section.

4. Method according to claim 1, wherein the test optical fiber section is formed by welding two optical fiber ends.

5. Method according to claim 1, wherein an optical image of the respective test optical fiber section is produced and acquired in at least one projection plane (x, z); and wherein the image information of this fiber image is offered for evaluation.

6. Method according to claim 5, wherein at least one test criterion for the constricting effect is determined from the image information of the test optical fiber section.

7. Method according to claim 1, wherein the change of intensity value within at least one measuring window (OL1) with which the outside contour (OL1) of at least one of the two long sides of the test optical fiber section is acquired in the region of its heating location is utilized as test criterion for the constricting effect.

8. Method according to claim 1, wherein the heating of the test optical fiber section is implemented with glow discharges.

9. Method according to claim 1, wherein the test optical fiber section residing under tensile stress is respectively heated until a first constricting effect occurs and becomes respectively measurable.

10. Method according to claim 1, wherein the test optical fiber section residing under tensile stress is heated until a predetermined rated constriction is achieved.

11. Method according to claim 10, wherein the rated constriction to be achieved is defined such that it is allocated to an optimum fiber viscosity during the later, thermal welding of light waveguides.

12. Method according to claim 10, wherein the rated constriction of the test optical fiber section to be achieved is selected approximately equal to half the original outside diameter thereof.

13. Method according to claim 1, wherein the test optical fiber section residing under tensile stress is continuously heated.

14. Method according to claim 13, wherein the test optical fiber section is heated with a steadily increasing welding current until a first constriction becomes measurable.

15. Method according to claim 14, wherein, beginning with the occurrence of the first constriction, the welding current is kept largely constant until a predetermined rated constriction is achieved.

16. Method according to claim 1, wherein a plurality of heat pulses is output onto the test optical fiber section residing under tensile stress in order to produce a constricting effect.

17. Method according to claim 16, wherein the welding current intensity of the heat pulses is increased from one heat pulse to the next until a first constriction becomes measurable.

18. Method according to claim 16, wherein the plurality of heat pulses is regulated such that an essentially constant tapering of the outside diameter of the test optical fiber section is achieved at the heating location per heat pulse output.

19. Method according to claim 18, wherein the individual pulse length of the plurality of heat pulses are regulated such that an essentially constant tapering of the outside diameter of the test optical fiber section is achieved at the heating location per heat pulse output.

20. Method according to claim 19, wherein the pulse lengths of those heat pulses are identified as test criterion for the constricting effect given the respectively present welding conditions beginning with which an essentially constant reduction in diameter of the test optical fiber section begins per heat pulse output.

21. A method according to claim 16, wherein the plurality of heat pulses include a dead time for cooling between adjacent pulses.

22. Method according to claim 1, wherein the time curve of a potentially triggered constricting effect is registered and offered for evaluation after and/or during the implementation of the respective heating event of the test optical fiber section.

23. Method according to claim 1, wherein time duration that is required for achieving a prescribable, radial cross-sectional reduction proceeding from the original outside diameter of the test optical fiber section is determined as test criterion for the constricting effect of the respective welding process.

24. Method according to claim 1, wherein welding current that is required for achieving a prescribable, radial cross-sectional reduction proceeding from the original outside diameter of the test optical fiber section is determined as test criterion for the constricting effect of the respective welding process.

* * * * *